United States Patent
Nagino et al.

(10) Patent No.: US 12,078,975 B2
(45) Date of Patent: Sep. 3, 2024

(54) APPARATUS, METHOD, AND RECORDING MEDIUM

(71) Applicant: ASAHI KASEI KABUSHIKI KAISHA, Tokyo (JP)

(72) Inventors: Goshu Nagino, Tokyo (JP); Hiroshi Kakihira, Tokyo (JP); Yohei Itoi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 364 days.

(21) Appl. No.: 17/468,714

(22) Filed: Sep. 8, 2021

(65) Prior Publication Data
US 2021/0405603 A1    Dec. 30, 2021

Related U.S. Application Data

(63) Continuation of application No. PCT/JP2020/013214, filed on Mar. 25, 2020.

(30) Foreign Application Priority Data

Mar. 29, 2019    (JP) .................................. 2019-065788

(51) Int. Cl.
G05B 19/042    (2006.01)

(52) U.S. Cl.
CPC .... *G05B 19/042* (2013.01); *G05B 2219/2639* (2013.01)

(58) Field of Classification Search
CPC ............ C12Q 1/6827; C12Q 2565/125; C12Q 2565/501; C01B 3/34; G05B 19/042;
(Continued)

(56) References Cited

U.S. PATENT DOCUMENTS

2003/0220720 A1    11/2003    Shimode
2004/0194382 A1*   10/2004    Fairlie .................... B60L 58/30
                                                    48/190
(Continued)

FOREIGN PATENT DOCUMENTS

CN    102592037 A    7/2012
CN    108009725 A    5/2018
(Continued)

OTHER PUBLICATIONS

Supplementary European Search Report for European Patent Application No. 20785289.8, issued by the European Patent Office on Aug. 4, 2022.
(Continued)

*Primary Examiner* — Kidest Bahta

(57) ABSTRACT

Provided is an apparatus for generating a operation plan of a hydrogen production system comprising a hydrogen production apparatus, comprising: a demand predicting unit for generating a predicted demand amount for each of a plurality of types of hydrogen with a different environmental load of production over a target period of the operation plan; and an operation planning unit for generating the operation plan, which is for generating a plurality of types of hydrogen with a different environmental load of production by the hydrogen production apparatus, based on a predicted hydrogen demand amount of each of the plurality of types of hydrogen.

18 Claims, 8 Drawing Sheets

(58) Field of Classification Search
CPC ....... G05B 2219/2639; G06Q 30/0202; G06Q 30/0206; H02J 15/008; H02J 2300/00; H02J 2310/00
See application file for complete search history.

(56) References Cited

U.S. PATENT DOCUMENTS

| | | | |
|---|---|---|---|
| 2005/0276749 A1 | 12/2005 | Noujima | |
| 2008/0127646 A1* | 6/2008 | Doland | F03D 9/007 60/495 |
| 2010/0185337 A1 | 7/2010 | Le Pivert | |
| 2012/0321977 A1* | 12/2012 | Katou | H01M 8/04955 429/429 |
| 2013/0007458 A1 | 1/2013 | Wakita | |
| 2013/0123994 A1* | 5/2013 | Greene | G05B 15/02 700/291 |
| 2014/0058534 A1 | 2/2014 | Tiwari | |
| 2014/0375126 A1 | 12/2014 | Kitagishi | |
| 2017/0315523 A1* | 11/2017 | Cross | G05B 17/02 |
| 2020/0226482 A1 | 7/2020 | Nagino | |
| 2021/0399575 A1 | 12/2021 | Nagino | |

FOREIGN PATENT DOCUMENTS

| | | |
|---|---|---|
| JP | 2003216697 A | 7/2003 |
| JP | 2006001797 A | 1/2006 |
| JP | 2008250501 A | 10/2008 |
| JP | 2016136435 A | 7/2016 |
| JP | 2017107702 A | 6/2017 |
| JP | 2018133939 A | 8/2018 |
| JP | 2018207728 A | 12/2018 |
| WO | 2017022135 A1 | 2/2017 |
| WO | 2018083781 A1 | 5/2018 |

OTHER PUBLICATIONS

International Preliminary Report on Patentability for International Application No. PCT/JP2020/013214, issued by the International Bureau of WIPO on Sep. 28, 2021.

Junichi Sato, "Hydrogen Energy Manegement System. Toshiba Review", 2016, vol. 71, No. 5, pp. 51-55.

* cited by examiner (a)

| GREEN HYDROGEN | GREY HYDROGEN | BLUE HYDROGEN (5:5) | BLUE HYDROGEN (7:3) |
|---|---|---|---|
| A (Nm3) | B (Nm3) | C (Nm3) | D (Nm3) |

········

(b)

| GREEN HYDROGEN | GREY HYDROGEN |
|---|---|
| A (Nm3) | B (Nm3) |

*FIG. 3*

APPARATUS, METHOD, AND RECORDING MEDIUM

The contents of the following Japanese patent application(s) are incorporated herein by reference:
NO. 2019-065788 filed in JP on Mar. 29, 2019; and
NO. PCT/JP2020/013214 filed in WO on Mar. 25, 2020.

BACKGROUND

1. Technical Field

The present invention relates to an apparatus, a method and a recording medium.

2. Related Art

Conventionally, a hydrogen production apparatus for generating hydrogen by electrolysis of water is known. Also, information on power generated from renewable energy sources includes the Guarantee of Origin (GoO), which proves that the power was generated from renewable energy sources.

BRIEF DESCRIPTION OF THE DRAWINGS

FIG. 3 illustrates an example of a database of a storage management unit of a control apparatus of the present embodiment.

DESCRIPTION OF EXEMPLARY EMBODIMENTS

Hereinafter, the invention will be described through embodiments of the invention, but the following embodiments do not limit the invention according to claims. In addition, not all of the combinations of features described in the embodiments are essential to the solving means of the invention.

Figure 1:
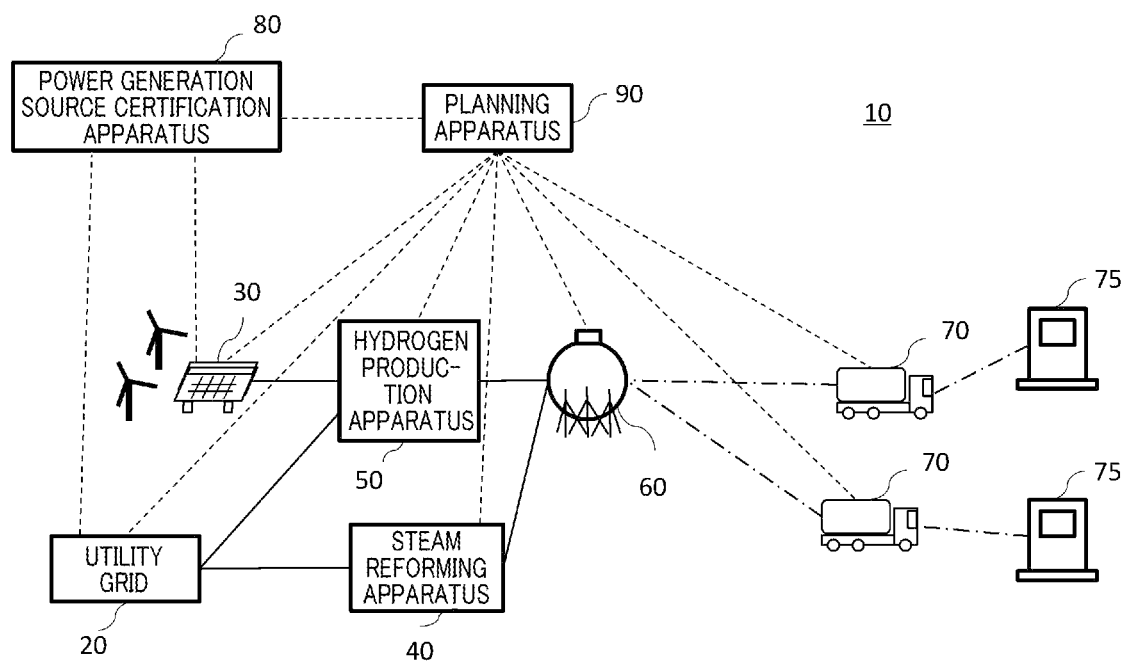
FIG. 1 illustrates a configuration of a hydrogen production system according to the present embodiment.

FIG. 1 illustrates a configuration of hydrogen production system 10 according to the present embodiment. The hydrogen production system 10 produces hydrogen according to the operation plan generated based on the prediction result of predicting the respective demand for hydrogen.

The hydrogen production system 10 includes a utility grid 20, a power generation apparatus 30, a steam reforming apparatus 40, a hydrogen production apparatus 50, a hydrogen storage apparatus 60, a transportation means 70, a power generation source certification apparatus 80 and a planning apparatus 90.

The utility grid 20 is connected to the hydrogen production apparatus 50 and the steam reforming apparatus 40. As an example, the utility grid 20 is a system that supplies power from one or more power plants that perform power generation from nuclear power, thermal power, and/or renewable energy, and so on, to a large number of consumers via the power grid. The utility grid 20 is one in which power rates (for example, selling and buying rates) can vary in predetermined every hour, every day, or every month or the like, depending on the power generation amount and demand amount, for example.

The power generation apparatus 30 is connected to the hydrogen production apparatus 50 via the power grid of the utility grid 20, or not via the power grid. The power generation apparatus 30 is a facility that performs power generation from renewable energy sources such as wind, solar, thermal, geothermal, hydraulic, and/or biomass. The power generation apparatus 30 supplies the generated power to the hydrogen production apparatus 50 to be connected.

The steam reforming apparatus 40 is connected to the hydrogen storage apparatus 60. The steam reforming apparatus 40 is, as one example, an apparatus that produces hydrogen from hydrocarbons such as methane using water vapor through the steam reforming (SMR) process. The steam reforming apparatus 40 may be operated with power supplied from the utility grid 20. The steam reforming apparatus 40 supplies the produced hydrogen to the hydrogen storage apparatus 60 for storage.

The hydrogen production apparatus 50 is connected to the hydrogen storage apparatus 60. The hydrogen production apparatus 50 produces an amount of hydrogen in accordance with the magnitude of the power supplied (the unit is also shown as normaleuve/hour, "Nm3/hour", for example), and supplies it to the hydrogen storage apparatus 60 for storage. The hydrogen production apparatus 50 receives power from the power generation apparatus 30 and the utility grid 20.

The hydrogen storage apparatus 60 stores a mixture of a plurality of types of hydrogen produced by the hydrogen production apparatus 50. The hydrogen storage apparatus 60 receives and stores the hydrogen produced by the hydrogen production apparatus 50 and the steam reforming apparatus 40, and supplies a plurality of transportation means 70 with the amount of hydrogen demanded according to the request of the demand customer 75. Herein, the demand customer 75 is, as an example, a hydrogen station that supplies hydrogen to fuel cell vehicles and so on.

The transportation means 70 is, for example, a trailer that stores and carries compressed hydrogen in a tank or the like, and a vehicle towing the trailer, or a pipe or the like connected from the hydrogen storage apparatus 60 to the demand customer 75. The transportation means 70 performs hydrogen transportation between the hydrogen storage apparatus 60 and at least one demand customer 75.

The power generation source certification apparatus 80 is connected communicatively to the utility grid 20, the power generation apparatus 30 and the planning apparatus 90. The power generation source certification apparatus 80 is, for example, an apparatus that performs at least one of issues and trades of the GoO certificates. The power generation source certification apparatus 80 may issue a certificate associated with the power of renewable energy generation to at least one of the utility grid 20, the power generation apparatus 30, and the hydrogen production apparatus 50, and transmit data treating the certificate. Also, the power generation source certification apparatus 80 also performs the process of trading certificates with at least one of the planning apparatus 90, the power generation apparatus 30, and the hydrogen production apparatus 50.

Herein, the GoO certificate is used to prove that the power associated with the certificate is power generated by renewable energy. Also, the GoO certificate can be traded for the certificate itself. In this case, the purchased certificate is to be associated with the second power that has a high environmental load of power generation among a plurality of types of power, so that the associated power amount of power among the second power can be treated as the first power that has a low environmental load of power generation (for example, power generated by renewable energy) and can be used. Herein, the second power of the present embodiment may be power that is considered to have a high environmental load, for example, it may be power that is not associated with a certificate, that is, power that has not been certified by a certificate or other means as being power generated by renewable energy. Certificates are purchased per unit of power amount. Also, the certificate price may vary depending on the expiration date of the certificate, the demand for power generated by renewable energy, or the power generation amount or the like of renewable energy.

The planning apparatus 90 is connected communicatively to each apparatus of the hydrogen production system 10. The planning apparatus 90 acquires and monitors the operation status of each apparatus of the hydrogen production system 10, and controls the input and/or output of each apparatus by communicating with each apparatus according to the generated operation plan. The planning apparatus 90 may also transmit various data to a terminal apparatus or the like of a manager or maintenance worker of each apparatus of the hydrogen production system 10, and allow such manager or the like to control each apparatus.

The planning apparatus 90 may be a computer such as a personal computer, tablet computer, smartphone, workstation, server computer, or general-purpose computer or the like, or it may be a computer system with a plurality of computers connected to it. The planning apparatus 90 may generate plans and other information through processing in a computer CPU, GPU (Graphics Processing Unit), and/or TPU (Tensor Processing Unit). Also, the planning apparatus 90 may perform various processes in the cloud provided by a server computer.

Figure 2:
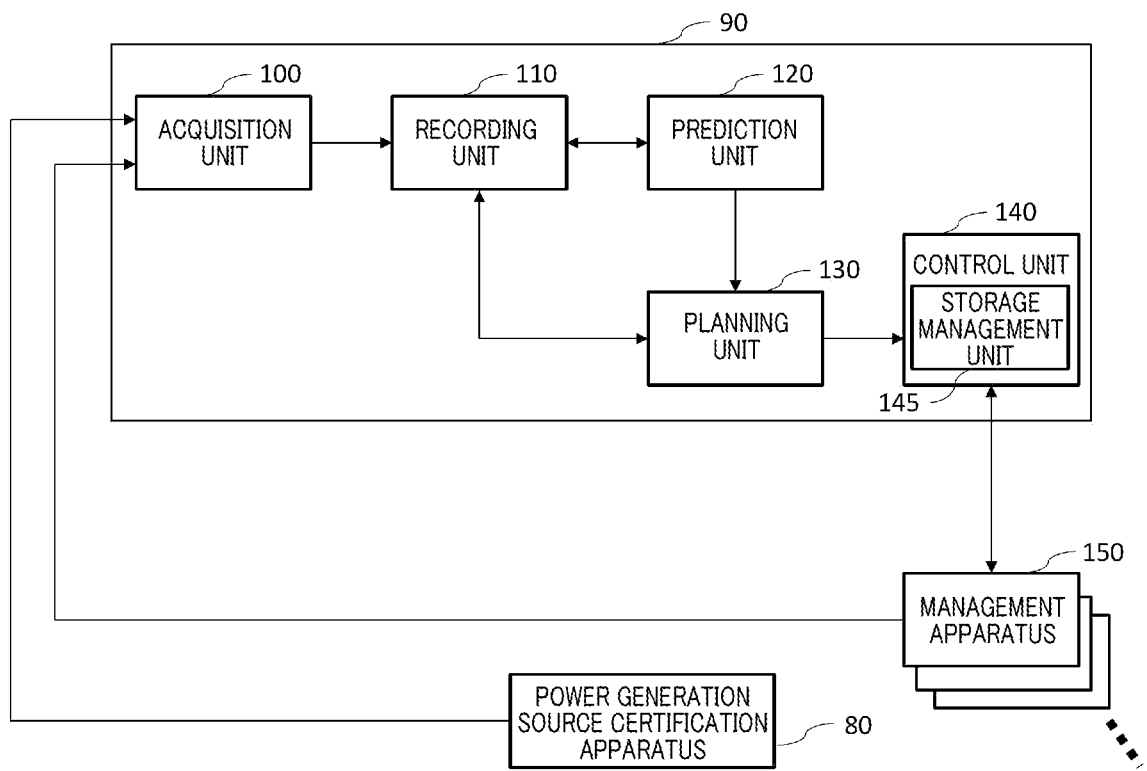
FIG. 2 illustrates a configuration of a planning apparatus of the present embodiment.

FIG. 2 illustrates a configuration of a planning apparatus 90 of the present embodiment. The planning apparatus 90 includes an acquisition unit 100, a recording unit 110, a prediction unit 120, a planning unit 130 and a control unit 140. Herein, the plurality of management apparatuses 150 may be a part of at least one apparatus of the hydrogen production system 10, or a terminal apparatus or the like of a manager or the like of the apparatus.

The acquisition unit 100 may be connected to the power generation source certification apparatus 80, the management apparatus 150, and the recording unit 110, and may acquire parameters and training data and so on for use in learning. The acquisition unit 100 may acquire data, which indicates the operation status and so on of each apparatus of the hydrogen production system 10, from the management apparatus 150 or external apparatuses and so on. The acquisition unit 100 may acquire data related to the GoO certificates from the power generation source certification apparatus 80. The acquisition unit 100 may acquire or purchase the GoO certificates from the power generation source certification apparatus 80. The acquisition unit 100 may be connected to a network or the like and acquire data via the network. If at least a part of the data to be acquired is recorded in an external database or the like, the acquisition unit 100 may access to the database or the like and acquire the data. The acquisition unit 100 may supply the acquired data to the recording unit 110.

The recording unit 110 may be connected to the prediction unit 120 and the planning unit 130, and record the information acquired by the acquisition unit 100. The recording unit 110 may record data to be processed by the planning apparatus 90. The recording unit 110 may record each of intermediate data, calculation results, parameters and the like that are calculated (or utilized) by the planning apparatus 90 in the process of generating an operation plan. In response to a request from each unit of the planning apparatus 90, the recording unit 110 may also supply the recorded data to the request source.

The prediction unit 120 is connected to the planning unit 130 and receives data such as prediction factors or actual performances from the recording unit 110. The prediction unit 120 generates, from the prediction factors and actual performances and so on, prediction results including at least one of the predicted demand amount, the predicted electricity price, the predicted power generation amount, the predicted certificate price, the predicted storage amount, the predicted first hydrogen price, the operation prediction, the transportation prediction, the predicted consumption amount, the predicted second hydrogen price and the predicted hydrogen production amount. The prediction unit 120 generates one or more models, learns (supervised learning as an example) and updates the model. The prediction unit 120 generates a prediction result based on the updated model. The prediction unit 120 supplies the prediction result to the recording unit 110 and/or the planning unit 130.

Herein, the predicted demand amount is the demand amount for each of the plurality of types of hydrogen produced by the hydrogen production apparatus 50 with different environmental load of hydrogen production over the target period of the operation plan. The predicted demand amount may include the cumulative demand amount for each type of hydrogen, and at least one of the hourly, daily, or monthly demand amounts. Herein, the demand amount of hydrogen may be the amount of hydrogen according to request of the demand customer 75 for the hydrogen produced by the hydrogen production system 10. For example, the demand amount of hydrogen may be the amount of hydrogen supplied to the hydrogen demand customer 75 plus a predetermined buffer amount to prevent the hydrogen storage amount in the hydrogen storage apparatus 60 from becoming zero.

Herein, a plurality of types of hydrogen with different environmental loads of production are managed as different types of hydrogen according to the environmental load of production, and the composition is the same. The environmental load of production may be, as an example, the environmental load of generating power to run the hydrogen production apparatus 50. The environmental load of power generation differs between the power generation by renewable energy and power generation by non-renewable energy such as thermal power. Therefore, in the present embodiment, as an example, the plurality of types of hydrogen include hydrogen produced from power generated by renewable energy (hereinafter referred to as "first power") (hereinafter referred to as "green hydrogen"), hydrogen produced from power with an opaque ratio between power generated by non-renewable energy such as thermal power or the like and power generated from renewable energy sources, but whose origin is not clearly proven by a certificate (hereinafter referred to as "second power") (hereinafter referred to as "grey hydrogen"), and hydrogen produced by mixing hydrogen produced by the power that is generated by renewable energy, and hydrogen produced by second power, in a predetermined ratio (hereinafter referred to as "blue hydrogen"). The second power in this embodiment may be the power supplied via the utility grid 20 through the power grid, and the grey hydrogen may be the hydrogen produced in the hydrogen production apparatus 50 while receiving the power supply from the utility grid 20. Note that the planning apparatus 90 may also manage hydrogen, which is generated with power generated by non-renewable energy (grey hydrogen), as green hydrogen by purchasing a GoO certificate for the power equivalent to the power used in the generation of such hydrogen from the power generation source certification apparatus 80.

The predicted electricity price is the electricity price for each of a plurality of types of power (for example, power generated by renewable energy and power generated by non-renewable energy) with different environmental loads of power generation over the target period. The predicted electricity price may be the price of power for each time period (selling price or purchasing price). The predicted electricity price may include at least one of the price of power supplied from the utility grid 20 via the power grid and the price of power from the power generation apparatus 30 (the price paid to the operator of the power generation apparatus 30 or the price of power calculated from the purchase/maintenance cost of the power generation apparatus 30 itself).

The predicted power generation amount is the power generation amount of the first power generated using renewable energy over the target period. The predicted power generation amount may include, for example, at least one of the cumulative amount of power generated by the power generation apparatus 30 and the hourly, daily, or monthly power generation amount over the target period.

The predicted certificate price is the certificate price for making available the second power, which has a higher environmental load of power generation, as the first power, which has a lower environmental load of power generation, over the target period of the operation plan. The predicted certificate price may be, for example, the purchase price from the power generation source certification apparatus 80 of the GoO certificate per unit of power amount over the target period.

The predicted storage amount may include at least one of the respective storage amounts of the plurality of types of hydrogen in the hydrogen storage apparatus 60 (for example, hourly, daily, or monthly storage amount, percentage of maximum possible storage amount, percentage of each type of hydrogen and so on) and the total storage amount of the plurality of types of hydrogen over the target period.

The predicted first hydrogen price may be the price per unit amount of each of the plurality of types of hydrogen produced by the hydrogen production apparatus 50 over the target period.

The operation prediction may include at least one of the following over the target period: the operation amount of the hydrogen production apparatus 50 (for example, the operation rate of the hydrogen production apparatus 50, the operation period, the cumulative amount of hydrogen produced, or the amount of hydrogen produced per unit time or the like), the amount of production of the plurality of types of hydrogen produced by the hydrogen production apparatus 50, the rate of production, the cumulative power amount of each of the plurality of types of power supplied to the hydrogen production apparatus 50, and the rate of power amount.

The transportation prediction may be a prediction of the plan to transport each of the plurality of types of hydrogen recorded by the hydrogen storage apparatus 60 by the transportation means 70 to at least one demand customer 75 over the target period. The transportation prediction may include, as an example, a prediction of the amount of each of the plurality of types of hydrogen that will be transported from the hydrogen storage apparatus 60 at each time period (that is, that must be recorded in the hydrogen storage apparatus 60 at each time period). The transportation prediction may include at least one of the number of transportation means 70, transportation routes, and the date and time of transportation from the hydrogen storage apparatus 60 over the target period.

The predicted consumption amount is the consumption amount of each of the plurality of types of hydrogen over the future target period. The predicted consumption amount may include at least one of the cumulative consumption amount of each type of hydrogen, and the hourly, daily, or monthly consumption amount of hydrogen. The consumption amount of hydrogen is not limited to the hydrogen produced by the hydrogen production system 10, but may be the amount of hydrogen consumed by the consumer. For example, the consumption amount of hydrogen is the consumption amount of hydrogen in one or more regions (for example, municipalities, prefectures, or countries or the like), or by one or more operators.

The predicted second hydrogen price may be the price of hydrogen produced by steam reforming in the steam reforming apparatus 40 over the target period.

The predicted hydrogen production amount may include the amount of hydrogen produced by steam reforming at the steam reforming apparatus 40 over the target period (for example, cumulative amount of hydrogen, hourly, daily, or monthly hydrogen consumption amount and so on).

The planning unit 130 is connected to the control unit 140 and generates planning data including at least one of the transportation plan and the operation plan. The planning unit 130 generates one or more models, learns and updates said models, and generates planning data based on the updated models. The planning unit 130 supplies the generated planning data to the recording unit 110 and the control unit 140.

Herein, the transportation plan is a plan to transport hydrogen recorded by the hydrogen storage apparatus to at least one demand customer over the target period. The transportation plan may include a plan that specifies at least one of a transportation route for each transportation means 70, a transportation distance for each transportation means 70, transportation time for each transportation means 70, a transportation cost for each transportation means 70, a number of transportation means 70, time to supply hydrogen from the hydrogen storage apparatus 60 to the transportation means 70, an amount of hydrogen to be supplied from the hydrogen storage apparatus 60 to the transportation means 70, and a type of each transportation means 70 between the hydrogen storage apparatus 60 and the demand customer 75 over the target period.

The operation plan may be a table or data or the like describing the state in which at least one apparatus of the hydrogen production system 10 should be operated in the first period. The operation plan may specify the amount of each of the plurality of types of hydrogen produced by the hydrogen production apparatus 50 over the target period. The operation plan may include the planned usage amount of each of the plurality of types of power with different environmental loads of power generation that is planned to be used over the target period to generate the plurality of types of hydrogen. The operation plan may include a plan to purchase GoO certificates over the target period. The operation plan may be, for example, a table or data that specifies the time periods during which the hydrogen production apparatus 50 is (or is not) operated, the time periods during which the hydrogen production apparatus 50 is operated with power from the power generation apparatus 30 and the time periods during which the generation apparatus 50 is operated with power from the utility grid 20 for each time period, and/or the operation rate of the hydrogen production apparatus 50 for each time period.

The control unit 140 may be communicatively connected to a plurality of management apparatuses 150. The control unit 140 may control each apparatus of the hydrogen production system 10 so as to operate the hydrogen production apparatus 50 according to the operation plan generated by the planning unit 130. Also, the control unit 140 may also transmit the planning data generated by the planning unit 130 to the management apparatus 150. The control unit 140 has a storage management unit 145.

The storage management unit 145 is connected to the hydrogen storage apparatus 60, the hydrogen production apparatus 50, and the steam reforming apparatus 40, and manages the respective storage amounts of the plurality of types of hydrogen recorded by the hydrogen storage apparatus 60. The storage management unit 145 may obtain the amount of hydrogen produced from the hydrogen storage apparatus 60 and the hydrogen production apparatus 50, as well as the current amount of hydrogen in the hydrogen storage apparatus 60. The storage management unit 145 may decrease the storage amount recorded for one hydrogen by the amount supplied to the transportation means 70 when one of the plurality of types of hydrogen is supplied from the hydrogen storage apparatus 60. The storage management unit 145 may have a database for managing the storage amount of the plurality of types of hydrogen.

FIG. 3 illustrates an example of the database for managing the storage amount of the plurality of types of hydrogen. FIG. 3(*a*) shows a database that manages the amount of each of three or more types of hydrogen, and FIG. 3(*b*) shows a database that manages the amount of two types of hydrogen.

The storage management unit 145 may increase the amount A of green hydrogen when storing hydrogen produced in the hydrogen production apparatus 50 by the power generated by renewable energy in the hydrogen storage apparatus 60. The storage management unit 145 may increase the amount B of grey hydrogen when the hydrogen produced by the hydrogen production apparatus 50 or the hydrogen produced by the steam reforming apparatus 40 is recorded in the hydrogen storage apparatus 60 using power generated by non-renewable energy. The storage management unit 145 may determine whether it is green hydrogen or grey hydrogen in response to an instruction or a certificate obtained from at least one of the power generation apparatus 30, the hydrogen production apparatus 50, the hydrogen storage apparatus 60, and the power generation source certification apparatus 80. Also, when storing hydrogen produced by the hydrogen production apparatus 50 or the steam reforming apparatus 40 using power generated by non-renewable energy, the storage management unit 145 may manage the hydrogen for the power corresponding to the certificate as green hydrogen by purchasing a certificate from the power generation source certification apparatus 80.

The storage management unit 145 may manage different mixing ratios of blue hydrogen in the database, as shown in FIG. 3(*a*). The storage management unit 145 may reduce the amount A of green hydrogen and the amount B of grey hydrogen according to the said mixing ratio in order to increase the amount C of blue hydrogen (green:grey=5:5) or the amount D of blue hydrogen (green:grey=7:3) to the planned amount. The storage management unit 145 may process the database when supplying hydrogen from the hydrogen storage apparatus 60 to the transportation means 70 or when storing hydrogen in the hydrogen storage apparatus 60.

Also, when one hydrogen (for example, blue hydrogen) is supplied from the hydrogen storage apparatus 60, the storage management unit 145 may treat the one hydrogen as a mixture of at least two of the plurality of types of hydrogen, and decrease the storage amount recorded for each of the at least two hydrogen types by the amount supplied according to the ratio determined according to the one hydrogen type. In this case, the storage management unit 145 may manage only the amount A of green hydrogen and the amount B of grey hydrogen in the database as shown in FIG. 3(*b*).

In addition, for example, if the storage management unit 145 is unable to supply blue hydrogen due to a shortage of either green hydrogen or grey hydrogen, it may manage the shortage of green hydrogen or grey hydrogen as negative and later adjust the grey hydrogen or green hydrogen to be positive by generating grey/green hydrogen or purchasing a GoO certificate and so on.

According to the above planning apparatus 90 of the present embodiment, the plurality of types of hydrogen can be efficiently generated and managed.

Figure 4:
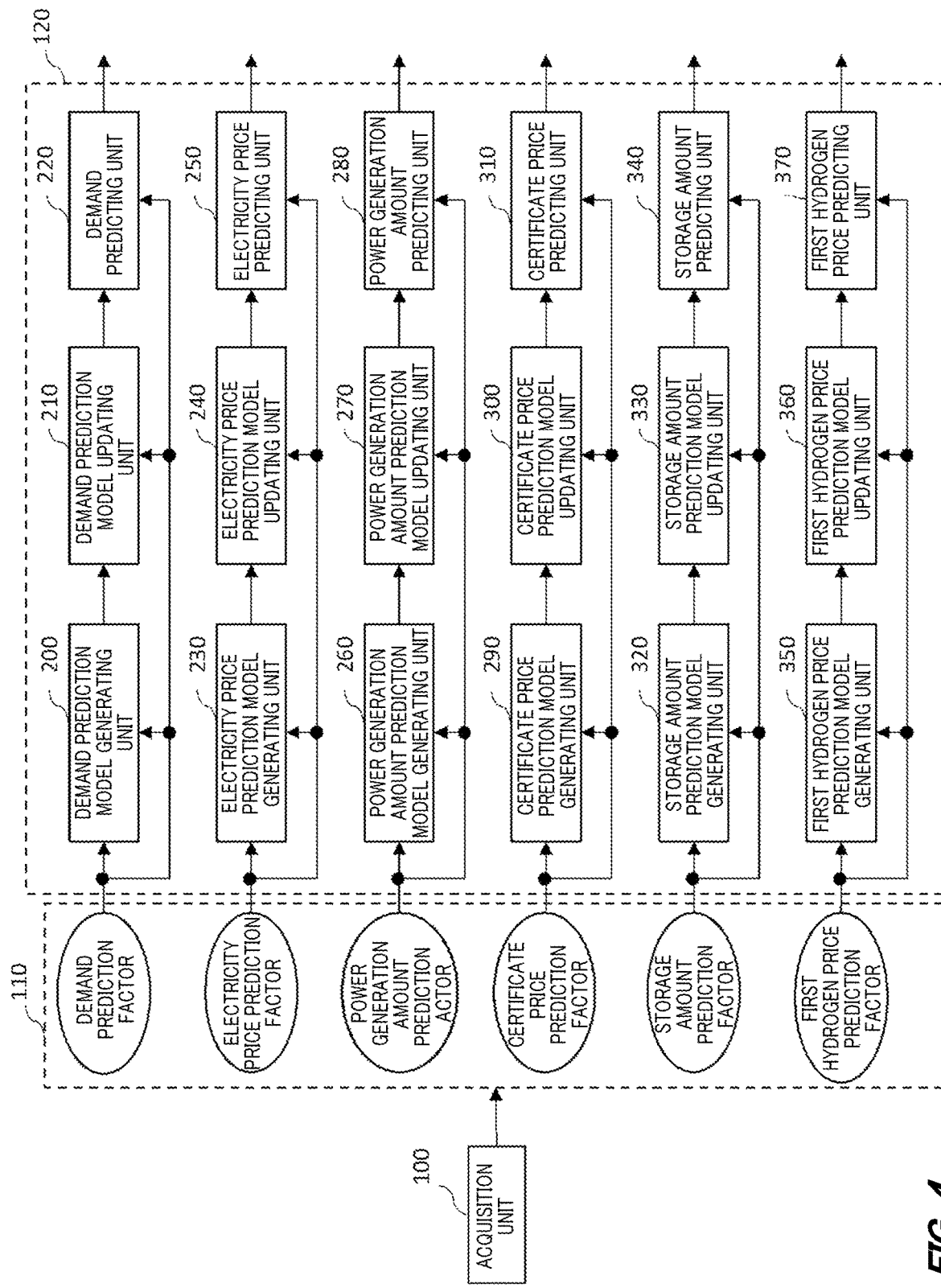
FIG. 4 illustrates in detail a configuration of a part of a prediction unit of the planning apparatus of the present embodiment.

FIG. 4 illustrates in detail a configuration example of a part of the prediction unit 120 of the planning apparatus 90 of the present embodiment. The prediction unit 120 has a demand prediction model generating unit 200, a demand prediction model updating unit 210, and a demand predicting unit 220 to generate demand predictions for each type of hydrogen. The prediction unit 120 has an electricity price prediction model generating unit 230, an electricity price prediction model updating unit 240, and an electricity price predicting unit 250 to generate a predicted electricity price. The prediction unit 120 has a power generation amount prediction model generating unit 260, a power generation amount prediction model updating unit 270, and a power generation amount predicting unit 280, and generates the predicted power generation amount of the power generation apparatus 30.

The prediction unit 120 has a certificate price prediction model generating unit 290, a certificate price prediction model updating unit 300, and a certificate price predicting unit 310, and generates predicted certificate prices. The prediction unit 120 has a storage amount prediction model generating unit 320, a storage amount prediction model updating unit 330, and a storage amount predicting unit 340 to generate the predicted storage amount of hydrogen for the hydrogen storage apparatus 60. The prediction unit 120 has a first hydrogen price prediction model generating unit 350, a first hydrogen price prediction model updating unit 360, and a first hydrogen price predicting unit 370 to generate the predicted first hydrogen price.

Herein, the recording unit 110 stores prediction factors including the demand prediction factor, the electricity price prediction factor, the power generation amount prediction factor, the certificate price prediction factor, the storage amount prediction factor, and the first hydrogen price prediction factor.

The demand prediction factor may include information about the demand amount for plurality of types of hydrogen produced by the hydrogen production apparatus 50. The demand prediction factor may include at least one of the following: the demand amount of hydrogen of the demand customer 75 prior to the target period, information about the demand customer 75 (for example, the number or scale of the demand customer 75 and so on), the consumption amount of hydrogen, weather information, the predicted consumption amount of hydrogen over the target period, and the operation prediction. Weather information may include at least one of the following: wind speed, wind direction, sunshine, rain, temperature, wave height, sunshine duration and so on.

The electricity price prediction factor may include information about the electricity price of the power supplied to the hydrogen production apparatus 50. The electricity price prediction factor may include at least one of the following: power rate, power demand amount, power supply amount, renewable energy power generation amount, weather information, information about the power generation apparatus 30 (for example, type, price of the apparatus, maintenance cost, power generation amount and so on) over the period prior to the target period, and weather information, and predicted renewable energy power generation amount over the target period.

The power generation amount prediction factor may include information on the power generation amount of renewable energy generated by the power generation apparatus 30. The power generation amount prediction factor may include at least one of the following: the power generation amount by the power generation apparatus 30 prior to the target period (for example, the power generation amount at each time period or the power generation efficiency and so on), the power supply amount by the power generation apparatus 30, the power supply amount from the utility grid 20 to the hydrogen production apparatus 50, the type of the power generation apparatus 30 (for example, the type of renewable energy used for power generation and so on), weather information, the period of use of the power generation apparatus 30, and the weather information over the target period. Also, the power generation amount prediction factor may also include virtual data calculated from a physical model of the power generation apparatus 30.

The certificate price prediction factor may include information about the trade price of the GoO certificate. The certificate price prediction factor may include at least one of the following: the price of the certificate, the power generation amount of the first power generated using renewable energy, the power demand of each power, the electricity price, the weather information prior to the target period, the weather information, the predicted electricity price, and the predicted power generation amount of the first power over the target period.

The storage amount prediction factor may include information on the storage amount of each type of hydrogen of the hydrogen storage apparatus 60. The storage amount prediction factor may include at least one of the following factors: the operation amount of the hydrogen production apparatus 50, the storage amount of hydrogen in the hydrogen storage apparatus 60, the demand amount of hydrogen, the amount of hydrogen that can be transported by each transportation means 70, the number of times hydrogen is supplied from the hydrogen storage apparatus 60 to the transportation means 70, and the date and time of hydrogen supply from the hydrogen storage apparatus 60 to the transportation means 70 in the period prior to the target period, the transportation prediction, the predicted demand amount, the predicted consumption amount, and the operation prediction over the target period.

The first hydrogen price prediction factor may include information on the price of each of the plurality of types of hydrogen produced by the hydrogen production apparatus 50. The first hydrogen price prediction factor may include at least one of the following: the price of each type of hydrogen, the demand amount for each type of hydrogen, the consumption amount of each type of hydrogen, the price of hydrogen produced by steam reforming prior to the target period, the predicted demand amount for hydrogen, the predicted consumption amount of hydrogen, the predicted electricity price, the operation prediction, and the predicted storage amount over the target period.

The demand prediction model generating unit 200 is connected to the recording unit 110 and the demand prediction model updating unit 210. The demand prediction model generating unit 200 receives data for model generation (for example, prediction factors and/or actual values and so on) from the recording unit 110 and generates a demand prediction model. The demand prediction model may be a model that predicts the predicted demand amount for each of the plurality of types of hydrogen to be produced by the hydrogen production apparatus 50 over the target period based on the demand prediction factor.

The demand prediction model generating unit 200 may generate a demand prediction model using information that is past the target period, through pre-learning or offline learning or the like. The demand prediction model generating unit 200 generates demand prediction models using, for example, regression analysis, Bayesian inference, neural networks, Gaussian mixture models, and hidden Markov models. It is also possible to predict the demand amount for hydrogen from a time sequence of factors by using a demand prediction model, such as LSTM (Long short-term memory), RNN (Recurrent Neural Network), and other models with memory, for example. The demand prediction model generating unit 200 supplies the generated demand prediction model to the demand prediction model updating unit 210.

The demand prediction model updating unit 210 is connected to the recording unit 110 and the demand predicting unit 220. The demand prediction model updating unit 210 updates the demand prediction model by learning, using the training data that includes actual values of the demand amount for the plurality of types of hydrogen. It is desirable for the demand prediction model updating unit 210 to learn by using further information that is later in time than the information on the demand prediction factors that the demand prediction model generating unit 200 used to generate the demand prediction model. The demand prediction model updating unit 210 may learn the demand prediction model using the demand prediction factor updated by the actual hydrogen demand. The demand prediction model updating unit 210 may, for example, update the demand prediction model by learning based on the demand prediction factors in the past period and the actual values of the demand amount after the past period.

The demand prediction model updating unit 210 may update the model to a new demand prediction model by learning at each predetermined update period. Alternatively, the demand prediction model updating unit 210 may update the demand prediction model according to various conditions, such as the fact that it has been learned a predetermined number of times or that the error difference due to learning has fallen below a predetermined threshold. The demand prediction model updating unit 210 may execute learning of the demand prediction model in response to the updated information of the demand prediction factors. The demand prediction model updating unit 210 may execute learning for one or more times in the update period. The demand prediction model updating unit 210 may also learn the demand prediction model by adaptive learning or online learning or the like. The demand prediction model updating unit 210 supplies the updated demand prediction model to the demand predicting unit 220.

The demand predicting unit 220 is connected to the recording unit 110. Based on the demand prediction factors, the demand predicting unit 220 generates the predicted demand amount for each of the plurality of types of hydrogen over the target period of the operation plan using a demand prediction model.

The demand predicting unit 220, for example, predicts the demand amount for each type of hydrogen over the target period in the future for each predetermined period. The demand predicting unit 220 predicts the demand amount by, for example, applying the demand prediction factors in the period immediately before the period to be predicted to the demand prediction model. The demand predicting unit 220 supplies the prediction results to the recording unit 110 for storage as factors to be used in the prediction unit 120 or the planning unit 130. The demand predicting unit 220 may also directly supply the prediction results to other configurations of the prediction unit 120 or to the planning unit 130.

The electricity price prediction model generating unit 230 is connected to the recording unit 110 and the electricity price prediction model updating unit 240. The electricity price prediction model generating unit 230 receives the data (for example, such as a prediction factor and/or an actual value) generated for model generation from the recording unit 110, and generates the electricity price prediction model. The electricity price prediction model may be a model that calculates the predicted electricity price over the target period based on the electricity price prediction factor.

The electricity price prediction model generating unit 230 may generate the electricity price prediction model using information prior to the target period through pre-learning or offline learning or the like. The electricity price prediction model generating unit 230 generates electricity price prediction model using, for example, regression analysis, Bayesian inference, neural networks, Gaussian mixture models, hidden Markov models and so on. It is also possible to predict electricity price from a time sequence of factors by using, for example, LSTM, RNN, and other models with memory as an electricity price prediction model. The electricity price prediction model generating unit 230 supplies the generated electricity price prediction model to the electricity price prediction model updating unit 240.

The electricity price prediction model updating unit 240 is connected to the recording unit 110 and the electricity price predicting unit 250. The electricity price prediction model updating unit 240 may update the electricity price prediction model by learning, using training data that includes the actual value of the electricity price for each of a plurality of types of power. It is desirable for the electricity price prediction model updating unit 240 to learn using further information that is later in time than the information of the electricity price prediction factor that the electricity price prediction model generating unit 230 used to generate the electricity price prediction model. The electricity price prediction model updating unit 240 may update the electricity price prediction model by learning based on, for example, the electricity price prediction factor over the past period and the actual value of the electricity price later than the past period. The electricity price prediction model updating unit 240 learns the electricity price prediction model using the information of the electricity price prediction factor, which is updated according to the transition of the actual electricity price.

The electricity price prediction model updating unit 240 may update a new electricity price prediction model by learning for every predetermined update period. Alternatively, the electricity price prediction model updating unit 240 may update the electricity price prediction model according to various conditions, such as the fact that the model has been learned a predetermined number of times or that the error difference due to learning has fallen below a predetermined threshold. The electricity price prediction model updating unit 240 may execute the learning of the electricity price prediction model according to various conditions such as the fact that the information of the electricity price prediction factor has been updated. The electricity price prediction model updating unit 240 may execute the learning for one or more times over the update period. The electricity price prediction model updating unit 240 may learn the electricity price prediction model by adaptive learning or online learning or the like. The electricity price prediction model updating unit 240 supplies the updated electricity price prediction model to the electricity price predicting unit 250.

The electricity price predicting unit 250 is connected to the recording unit 110. The electricity price predicting unit 250 generates the predicted electricity price over the target period of the operation plan using the electricity price prediction model based on the electricity price prediction factor for each of the plurality of types of power.

The electricity price predicting unit 250 predicts the future electricity price over the future target period for every predetermined period. The electricity price predicting unit 250 applies, for example, the information of the electricity price prediction factor over the period immediately before the period to be predicted to the electricity price prediction model, and predicts the electricity price for each of the plurality of types of power. The electricity price predicting unit 250 supplies the prediction result for storage as the factor to be used in the prediction unit 120 or the planning unit 130, to the recording unit 110. The electricity price predicting unit 250 may also directly supply the prediction result to another configuration of the prediction unit 120 or the planning unit 130.

The power generation amount prediction model generating unit 260 is connected to the recording unit 110 and the power generation amount prediction model updating unit 270. The power generation amount prediction model generating unit 260 receives the data (for example, such as the prediction factor and/or the actual value) for model generation from the recording unit 110 and generates the power generation amount prediction model. The power generation amount prediction model may be a model for predicting the predicted power generation amount of a first power generated using renewable energy in the power generation apparatus 30 over the target period, based on the power generation amount prediction factor.

The power generation amount prediction model generating unit 260 may generate the power generation amount prediction model using the information prior to the target period through pre-learning or offline learning or the like. The power generation amount prediction model generating unit 260 generates the power generation amount prediction model using, for example, regression analysis, Bayesian inference, neural networks, Gaussian mixture models, and hidden Markov models and so on. The power generation amount can also be predicted from a time sequence of factors if, for example, a model with LSTM, RNN, and other memories is used as the power generation amount prediction model. The power generation amount prediction model generating unit 260 supplies the generated power generation amount prediction model to the power generation amount prediction model updating unit 270.

The power generation amount prediction model updating unit 270 is connected to the recording unit 110 and the power generation amount predicting unit 280. The power generation amount prediction model updating unit 270 updates the power generation amount prediction model by learning using the training data including the actual value of the renewable energy power generation amount of the power generation apparatus 30. It is desirable for the power generation amount prediction model updating unit 270 to learn further using information that is later in time than the information of the power generation amount prediction factor that the power generation amount prediction model generating unit 260 used to generate the power generation amount prediction model. The power generation amount prediction model updating unit 270 may update the power generation amount prediction model by learning based on, for example, the power generation amount prediction factor over the past period and the actual value of the power generation amount of the power generation apparatus 30 after the past period. The power generation amount prediction model updating unit 270 may learn the power generation amount prediction model using the information of the power generation amount prediction factor that is updated by the actual power generation of the power generation apparatus 30.

The power generation amount prediction model updating unit 270 may update the new power generation amount prediction model by learning for every predetermined update period. Alternatively, the power generation amount prediction model updating unit 270 may update the power generation amount prediction model according to various conditions such as the fact that the modes have been learned for a predetermined number of times or that the error difference due to learning has fallen below a predetermined threshold. The power generation amount prediction model updating unit 270 may execute the learning of the power generation amount prediction model according to various conditions such as the fact that the information of the power generation amount prediction factor has been updated. The power generation amount prediction model updating unit 270 may execute the learning for one or more times over the update period. The power generation amount prediction model updating unit 270 may learn the power generation amount prediction model through adaptive learning or online learning or the like. The power generation amount prediction model updating unit 270 supplies the updated power generation amount prediction model to the power generation amount predicting unit 280.

The power generation amount predicting unit 280 is connected to the recording unit 110. The power generation amount predicting unit 280 generates the predicted power generation amount of the power generation apparatus 30 using the power generation amount prediction model based on the power generation amount prediction factor.

The power generation amount predicting unit 280 predicts the power generation amount of the power generation apparatus 30 over the target period in the future for, for example, every predetermined period. The power generation amount predicting unit 280 receives the power generation amount prediction factor from the recording unit 110. The power generation amount predicting unit 280 applies, for example, the information of the power generation amount prediction factor over the period immediately before the period to be predicted, to the power generation amount prediction model, and predicts the power generation amount of the power generation apparatus 30. The power generation amount predicting unit 280 supplies the prediction result to the recording unit 110 for storage as factors to be used in the prediction unit 120 or the planning unit 130. The power generation amount predicting unit 280 may also directly supply the prediction result to another configuration of the prediction unit 120 or the planning unit 130.

The certificate price prediction model generating unit 290 is connected to the recording unit 110 and the certificate price prediction model updating unit 300. The certificate price prediction model generating unit 290 receives data (for example, such as the prediction factor and/or the actual value) for model generation from the recording unit 110, and generates the certificate price prediction model. The certificate price prediction model may be a model for calculating the predicted certificate price over the target period based on the certificate price prediction factor.

The certificate price prediction model generating unit 290 may generate the certificate price prediction model using the information prior to the target period through pre-learning or offline learning or the like. The certificate price prediction model generating unit 290 generates the certificate price prediction model using, for example, regression analysis, Bayesian inference, neural networks, Gaussian mixture models, hidden Markov models and so on. It is also possible to predict the certificate price from a time sequence of factors by using, for example, LSTM, RNN and other models with memory as a certificate price prediction model. The certificate price prediction model generating unit 290 supplies the generated certificate price prediction model to the certificate price prediction model updating unit 300.

The certificate price prediction model updating unit 300 is connected to the recording unit 110 and the certificate price predicting unit 310. The certificate price prediction model updating unit 300 may update the certificate price prediction model by learning, using training data that includes the actual value of the certificate price. It is desirable for the certificate price prediction model updating unit 300 to learn further using information that is later in time than the information of the certificate price prediction factor used to generate the certificate price prediction model by the certificate price prediction model generating unit 290. The certificate price prediction model updating unit 300 may update the certificate price prediction model by learning based on, for example, the certificate price prediction factor over the past period and the actual value of the certificate price after the past period. The certificate price prediction model updating unit 300 learns the certificate price prediction model using the information of the certificate price prediction factor updated by actual trading between the planning apparatus 90 and the power generation source certification apparatus 80.

The certificate price prediction model updating unit 300 may update a new certificate price prediction model by learning for every predetermined update period. Alternatively, the certificate price prediction model updating unit 300 may update the certificate price prediction model according to various conditions, such as the fact that the model has been learned for a predetermined number of times or that the error difference due to learning has fallen below a predetermined threshold. The certificate price prediction model updating unit 300 may execute the learning of the certificate price prediction model according to various conditions such as the fact that the information of the certificate price prediction factor has been updated. The certificate price prediction model updating unit 300 may execute the learning for one or more times over the update period. The certificate price prediction model updating unit 300 may learn the certificate price prediction model by adaptive learning or online learning or the like. The certificate price prediction model updating unit 300 supplies the updated certificate price prediction model to the certificate price predicting unit 310.

The certificate price predicting unit 310 is connected to the recording unit 110. The certificate price predicting unit 310 generates the predicted certificate price of the certificate using the certificate price prediction model based on the certificate price prediction factor.

The certificate price predicting unit 310 predicts the certificate price over the target period in the future for, for example, every predetermined period. The certificate price predicting unit 310 receives the certificate price prediction factor from the recording unit 110. The certificate price predicting unit 310 predicts the certificate price by applying the information of the certificate price prediction factor over the period immediately before the period to be predicted, to the certificate price prediction model, for example. The certificate price predicting unit 310 supplies the prediction result for storage as the factor to be used in the prediction unit 120 or the planning unit 130, to the recording unit 110. The certificate price predicting unit 310 may also directly supply the prediction result to another configuration of the prediction unit 120 or the planning unit 130.

The storage amount prediction model generating unit 320 is connected to the recording unit 110 and the storage amount prediction model updating unit 330. The storage amount prediction model generating unit 320 receives the data (for example, such as the prediction factor and/or the actual value) for model generation from the recording unit 110 and generates the storage amount prediction model. The storage amount prediction model may be a model that predicts the predicted storage amount of hydrogen in the hydrogen storage apparatus 60 over the target period for each of the plurality of types of hydrogen, based on the storage amount prediction factor prior to the target period.

The storage amount prediction model generating unit 320 may generate the storage amount prediction model using the storage amount prediction factor prior to the target period through pre-learning or offline learning or the like. The storage amount prediction model generating unit 320 generates the storage amount prediction model using, for example, regression analysis, Bayesian inference, neural networks, Gaussian mixture models, and hidden Markov models and so on. The storage amount of the hydrogen storage apparatus 60 can also be predicted from a time sequence of factors if, for example, a model with LSTM, RNN, and other memories is used as the storage amount prediction model. The storage amount prediction model generating unit 320 supplies the generated storage amount prediction model to the storage amount prediction model updating unit 330.

The storage amount prediction model updating unit 330 is connected to the recording unit 110 and the storage amount predicting unit 340. The storage amount prediction model updating unit 330 may update the storage amount prediction model by learning using the training data including the actual value of the hydrogen storage amount of the hydrogen storage apparatus 60. It is desirable for the storage amount prediction model updating unit 330 to learn further using information that is later in time than the information of the storage amount prediction factor used to generate the storage amount prediction model by the storage amount prediction model generating unit 320. The storage amount prediction model updating unit 330 may update the storage amount prediction model by learning based on, for example, the storage amount prediction factor over the past period and the actual value of the hydrogen storage amount of the hydrogen storage apparatus 60 after the past period. The storage amount prediction model updating unit 330 may learn the storage amount prediction model using the information of the storage amount prediction factor that is updated by the actual transition of the hydrogen storage amount.

The storage amount prediction model updating unit 330 may update the new storage amount prediction model by learning for every predetermined update period. Alternatively, the storage amount prediction model updating unit 330 may update the storage amount prediction model according to various conditions such as the fact that the modes have been learned for a predetermined number of times or that the error difference due to learning has fallen below a predetermined threshold. The storage amount prediction model updating unit 330 may execute the learning of the storage amount prediction model according to various conditions such as the fact that the information of the storage amount prediction factor has been updated. The storage amount prediction model updating unit 330 may execute the learning for one or more times over the update period. The storage amount prediction model updating unit 330 may learn the storage amount prediction model through adaptive learning or online learning or the like. The storage amount prediction model updating unit 330 supplies the updated storage amount prediction model to the storage amount predicting unit 340.

The storage amount predicting unit 340 is connected to the recording unit 110. The storage amount predicting unit 340 may generate the predicted storage amount by using the storage amount prediction factor and the storage amount prediction model, for each of the plurality of types of hydrogen.

The storage amount predicting unit 340 predicts the hydrogen storage amount of the hydrogen storage apparatus 60 over the target period in the future for every predetermined period. The storage amount predicting unit 340 applies, for example, the information of the storage amount prediction factor over the period immediately before the period to be predicted, to the storage amount prediction model, and predicts the hydrogen storage amount of the hydrogen storage apparatus 60. The storage amount predicting unit 340 supplies the prediction result to the recording unit 110 for storage as factors to be used in the prediction unit 120 or the planning unit 130. The storage amount predicting unit 340 may also directly supply the prediction result to another configuration of the prediction unit 120 or the planning unit 130.

The first hydrogen price prediction model generating unit 350 is connected to the recording unit 110 and the first hydrogen price prediction model updating unit 360. The first hydrogen price prediction model generating unit 350 receives data (for example, such as the prediction factor and/or the actual value) for model generation from the recording unit 110, and generates the first hydrogen price prediction model. The first hydrogen price prediction model may be a model for predicting the predicted first hydrogen price of the hydrogen over the target period based on the first hydrogen price prediction factor for each of the plurality of types of hydrogen.

The first hydrogen price prediction model generating unit 350 may generate the first hydrogen price prediction model using the information prior to the target period through pre-learning or offline learning or the like. The first hydrogen price prediction model generating unit 350 generates the first hydrogen price prediction model using, for example, regression analysis, Bayesian inference, neural networks, Gaussian mixture models, hidden Markov models and so on. It is also possible to predict the first hydrogen price from a time sequence of the factors by using, for example, LSTM, RNN and other models with memory as a first hydrogen price prediction model. The first hydrogen price prediction model generating unit 350 supplies the generated first hydrogen price prediction model to the first hydrogen price prediction model updating unit 360.

The first hydrogen price prediction model updating unit 360 is connected to the recording unit 110 and the first hydrogen price predicting unit 370. The first hydrogen price prediction model updating unit 360 updates the first hydrogen price prediction model by learning, using training data that includes the actual value of the first hydrogen price. It is desirable for the first hydrogen price prediction model updating unit 360 to learn further using information that is later in time than the information of the first hydrogen price prediction factor used to generate the first hydrogen price prediction model by the first hydrogen price prediction model generating unit 350. The first hydrogen price prediction model updating unit 360 may update the first hydrogen price prediction model by learning based on, for example, the first hydrogen price prediction factor over the past period and the actual value of the first hydrogen price after the past period. The first hydrogen price prediction model updating unit 360 learns the first hydrogen price prediction model using the information of the first hydrogen price prediction factor updated by actual trading of the first hydrogen.

The first hydrogen price prediction model updating unit 360 may update a new first hydrogen price prediction model by learning for every predetermined update period. Alternatively, the first hydrogen price prediction model updating unit 360 may update the first hydrogen price prediction model according to various conditions, such as the fact that the model has been learned for a predetermined number of times or that the error difference due to learning has fallen below a predetermined threshold. The first hydrogen price prediction model updating unit 360 may execute the learning of the first hydrogen price prediction model according to various conditions such as the fact that the information of the first hydrogen price prediction factor has been updated. The first hydrogen price prediction model updating unit 360 may execute the learning for one or more times over the update period. The first hydrogen price prediction model updating unit 360 may learn the first hydrogen price prediction model by adaptive learning or online learning or the like. The first hydrogen price prediction model updating unit 360 supplies the updated first hydrogen price prediction model to the first hydrogen price predicting unit 370.

The first hydrogen price predicting unit 370 is connected to the recording unit 110. The first hydrogen price predicting unit 370 generates the predicted first hydrogen price for each of the plurality of types of hydrogen by using the first hydrogen price prediction model.

The first hydrogen price predicting unit 370 predicts the first hydrogen price over the target period in the future for, for example, every predetermined period. The first hydrogen price predicting unit 370 receives the first hydrogen price prediction factor from the recording unit 110. The first hydrogen price predicting unit 370 predicts the first hydrogen price by applying the information of the first hydrogen price prediction factor over the period immediately before the period to be predicted, to the first hydrogen price prediction model, for example. The first hydrogen price predicting unit 370 supplies the prediction result for storage as the factor to be used in the prediction unit 120 or the planning unit 130, to the recording unit 110. The first hydrogen price predicting unit 370 may also directly supply the prediction result to another configuration of the prediction unit 120 or the planning unit 130.

Figure 5:
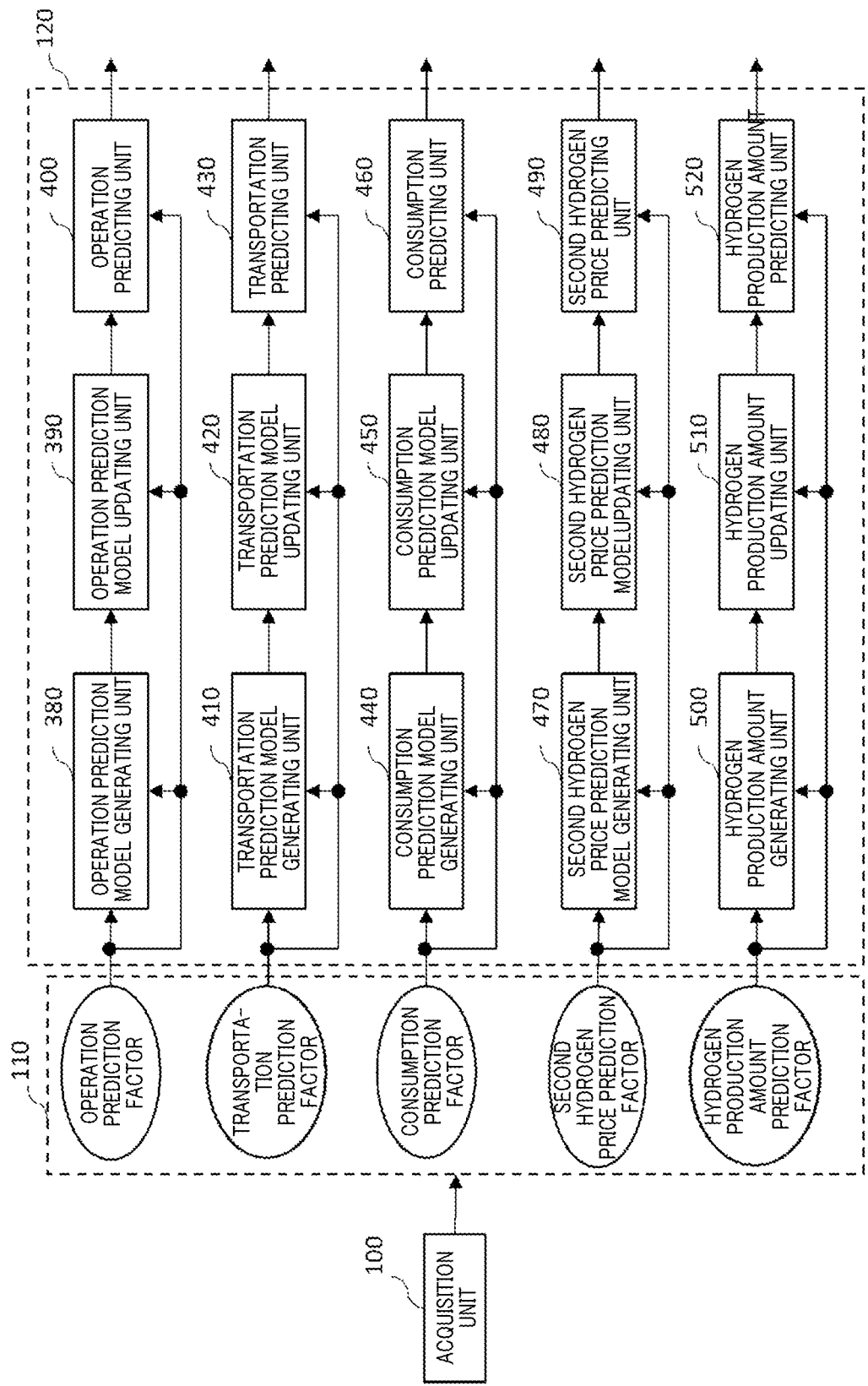
FIG. 5 illustrates in detail a configuration of another part of the prediction unit of the planning apparatus of the present embodiment.

FIG. 5 illustrates in detail a configuration example of another part of the prediction unit 120 of the planning apparatus 90 of the present embodiment. The prediction unit 120 of the planning apparatus 90 of the present embodiment may have the configuration shown in FIG. 4 and the configuration shown in FIG. 5.

The prediction unit 120 includes an operation prediction model generating unit 380, an operation prediction model updating unit 390 and a operation predicting unit 400, and generates the operation prediction. The prediction unit 120 includes a transportation prediction model generating unit 410, a transportation prediction model updating unit 420 and a transportation predicting unit 430, and generates the transportation prediction. The prediction unit 120 includes a consumption prediction model generating unit 440, a consumption prediction model updating unit 450, and a consumption predicting unit 460, and generates the predicted consumption amount of hydrogen. The prediction unit 120 includes a second hydrogen price prediction model generating unit 470, a second hydrogen price prediction model updating unit 480, and a second hydrogen price predicting unit 490 and generates the predicted second hydrogen price. The prediction unit 120 includes a hydrogen production amount generating unit 500, a hydrogen production amount updating unit 510 and a hydrogen production amount predicting unit 520 and generates the predicted hydrogen production amount of hydrogen produced by steam reforming.

Herein, the recording unit 110 further stores the prediction factors including the operation prediction factor, the transportation prediction factor, the consumption prediction factor, the second hydrogen price prediction factor and the hydrogen production amount prediction factor.

The operation prediction factor may include information on the operation of the hydrogen production apparatus 50. The operation prediction factor may include at least one of the operation amount of the hydrogen production apparatus 50, the generation amount of each type of hydrogen, the storage amount of each type of hydrogen in the hydrogen storage apparatus 60, the hydrogen demand amount, the hydrogen price, the operation plan of the hydrogen production apparatus 50, the hydrogen production efficiency of the hydrogen production apparatus 50 (for example, such as the hydrogen production amount per unit power or per unit time) prior to the target period, and the predicted demand amount, the predicted consumption amount, the predicted first hydrogen price and the predicted storage amount over the target period.

The transportation prediction factor may include information on hydrogen transportation between the hydrogen production apparatus 50 and the demand customer 75. The transportation prediction factor may include at least one of the operation prediction of the hydrogen production apparatus 50 and the predicted demand amount of each type of hydrogen over the target period. The transportation prediction factor may further include at least one of the supply date, supply amount, the number of supplies of each type of hydrogen, the number of the hydrogen transportation means 70, the type of each means of transportation 70, the hydrogen transportable amount of hydrogen of each means of transportation 70, the transportation cost of each means of transportation 70, the transportation time of each means of transportation 70, the transportation time of each means of transportation 70, the available time period of the plurality of transportation means 70, and the arrangement of the plurality of transportation means 70, from the hydrogen storage apparatus 60 to the transportation means 70 prior to the target period.

The consumption prediction factor may include information on consumption of each type of hydrogen. The consumption prediction factor may include the demand amount of each type of hydrogen, the consumption amount of each type of hydrogen, weather information, the price of each type of hydrogen, factors related to the usage amount of each type of hydrogen for the demand customer 75 prior to the target period, and the predicted demand amount of hydrogen over the target period. Herein, the factors related to the usage amount of hydrogen for the demand customer 75 may include at least one of, for example, the number of the demand customers 75 purchasing hydrogen produced by the hydrogen production system 10, and types of the demand customers 75 (for example, the operators or the like of the hydrogen station for supplying hydrogen to a fuel cell bus or the like).

The second hydrogen price prediction factor may include information on the price of hydrogen produced by the steam reforming apparatus 40. The second hydrogen price prediction factor may include at least one of the price of the hydrogen generate by steam reforming, the hydrogen production amount, the hydrogen demand amount, the hydrogen consumption amount prior to the target period, and the predicted demand amount of hydrogen, the predicted consumption amount of hydrogen, the predicted electricity price, the operation prediction, and the predicted storage amount over the target period.

The hydrogen production amount prediction factor may include information on the hydrogen produced by the steam reforming apparatus 40. The hydrogen production amount prediction factor may include at least one of the operation plan, the operation amount of the hydrogen production apparatus 50, the hydrogen production amount of the hydrogen production apparatus 50, the amount of hydrogen produced by the steam reforming apparatus 40, the hydrogen demand amount, the hydrogen consumption amount, the number of the demand customer 75, weather information, hydrogen price prior to target period, and the predicted demand amount, the predicted consumption amount and the operation plan prior to the target period.

The operation prediction model generating unit 380 is connected to the recording unit 110 and the operation prediction model updating unit 390, and receives the data (for example, such as the prediction factor and/or the actual performance) for model generation from the recording unit 110. The operation prediction model generating unit 380 may generate the operation prediction model based on the operation prediction factor. The operation prediction model may be a model for generating the operation prediction of the hydrogen production apparatus 50 over the target period based on the operation prediction factor.

The operation prediction model generating unit 380 may generate the operation prediction model using the information prior to the target period through pre-learning or offline learning or the like. The operation prediction model generating unit 380 generates the operation prediction model using, for example, regression analysis, Bayesian inference, neural networks, Gaussian mixture models, and hidden Markov models and so on. The operation of the hydrogen production apparatus 50 can also be predicted from a time sequence of factors if, for example, a model with LSTM, RNN and other memories is used as the operation prediction model. The operation prediction model generating unit 380 supplies the generated operation prediction model to the operation prediction model updating unit 390.

The operation prediction model updating unit 390 is connected to the recording unit 110 and the operation predicting unit 400, and receives the data (for example, such as the prediction factor and/or the actual performance) for learning from the recording unit 110. The operation prediction model updating unit 390 updates the operation prediction model by learning using the training data including the actual performance of the operation (the operation amount or the generation amount of each type of hydrogen or the like) of the hydrogen production apparatus 50. It is desirable for the operation prediction model updating unit 390 to learn further using information that is later in time than the information of the operation prediction factor used to generate the operation prediction model by the operation prediction model generating unit 380. The operation prediction model updating unit 390 learns the operation prediction model using the information of the operation prediction factor that is updated by the actual operation of the hydrogen production apparatus 50. The operation prediction model updating unit 390 may update the operation prediction model by learning based on, for example, the operation prediction factor over the past period and the actual performance of the operation of the hydrogen production apparatus 50 after the past period.

The operation prediction model updating unit 390 may update a new operation prediction model by learning for every predetermined update period (for example, in an interval of x hours or x days). Alternatively, the operation prediction model updating unit 390 may update the operation prediction model according to various conditions such as the fact that the modes have been learned for a predetermined number of times or that the error difference due to learning has fallen below a predetermined threshold. The operation prediction model updating unit 390 may execute the learning of the operation prediction model according to various conditions such as the fact that the information of the operation prediction factor has been updated. The operation prediction model updating unit 390 may execute the learning for one or more over the update period. The operation prediction model updating unit 390 may also learn the operation prediction model through adaptive learning or online learning or the like. The operation prediction model updating unit 390 supplies the updated operation prediction model to the operation predicting unit 400.

The operation predicting unit 400 is connected to the recording unit 110. The operation predicting unit 400 generates the operation prediction of the hydrogen production apparatus 50 using the operation prediction model based on the operation prediction factor.

The operation predicting unit 400 predicts the operation of the hydrogen production apparatus 50 over the target period in the future for, for example, every predetermined period. The operation predicting unit 400 applies, for example, the information of the operation prediction factor over the period immediately before the target period, to the operation prediction model, and predicts the operation amount of the hydrogen production apparatus 50. The operation predicting unit 400 supplies the prediction result to the recording unit 110 for storage as factors to be used in the prediction unit 120 or the planning unit 130. The operation predicting unit 400 may also directly supply the prediction result to another configuration of the prediction unit 120 or the planning unit 130.

The transportation prediction model generating unit 410 is connected to the recording unit 110 and the transportation prediction model updating unit 420. The transportation prediction model generating unit 410 generates the transportation prediction model based on the transportation prediction factor prior to the predict target period. The transportation prediction model may be a model for generating the transportation prediction, which is the prediction of the transportation plan of each of the plurality of types of hydrogen, which is recorded in the hydrogen storage apparatus 60, over the target period, toward at least one demand customer 75.

The transportation prediction model generating unit 410 may generate the transportation prediction model by the process referred to as pre-learning or offline learning, using the information prior to the target period. The transportation prediction model generating unit 410 generates the transportation prediction model using, for example, regression analysis, Bayesian inference, neural networks, Gaussian mixture models, hidden Markov models and so on. It is also possible to predict the transportation from a time sequence of factors by using, for example, LSTM, RNN and other models with memory as a transportation prediction model. The transportation prediction model generating unit 410 supplies the generated transportation prediction model to the transportation prediction model updating unit 420.

The transportation prediction model updating unit 420 is connected to the recording unit 110 and the transportation predicting unit 430. The transportation prediction model updating unit 420 may update the transportation prediction model by learning, using the training data including the actual value of transportation (for example, the contents of the actually executed transportation plan). The transportation prediction model updating unit 420 may update a new transportation prediction model by learning for every predetermined update period, for example. Alternatively, the transportation prediction model updating unit 420 may update the transportation prediction model according to various conditions, such as the fact that the model has been learned for a predetermined number of times or that the error difference due to learning has fallen below a predetermined threshold.

It is desirable for the transportation prediction model updating unit 420 to learn further using information that is later in time than the information of the transportation prediction factor used to generate the transportation prediction model by the transportation prediction model generating unit 410. The transportation prediction model updating unit 420 may update the transportation prediction model by learning based on, for example, the value of the transportation prediction factor over past period and the actual value of transportation after the past period. The transportation prediction model updating unit 420 learns the transportation prediction model using the information of transportation prediction factor that is updated by the actual execution of the transportation plan. The transportation prediction model updating unit 420 may execute the learning of the transportation prediction model according to various conditions such as the fact that the information of the transportation prediction factor has been updated. The transportation prediction model updating unit 420 may execute the learning for one or more times over the update period. The transportation prediction model updating unit 420 may also learn the transportation prediction model through the process referred to as adaptive learning or online learning or the like. The transportation prediction model updating unit 420 supplies the updated transportation prediction model to the transportation predicting unit 430.

The transportation predicting unit 430 is connected to the recording unit 110. The transportation predicting unit 430 generates the transportation prediction over the target period using the transportation prediction model based on the transportation prediction factor.

The transportation predicting unit 430 predicts the transportation plan over the target period in the future for every predetermined period, for example. The transportation predicting unit 430 applies the information of the transportation prediction factor over the period immediately before the target period to the transportation prediction model and predicts the transportation plan, for example. The transportation predicting unit 430 supplies the prediction result for storage as factors to be used in the prediction unit 120 or the planning unit 130, to the recording unit 110. The transportation predicting unit 430 may also directly supply the prediction result to another configuration or the prediction unit 120 or the planning unit 130.

The consumption prediction model generating unit 440 is connected to the recording unit 110 and the consumption prediction model updating unit 450. The consumption prediction model generating unit 440 receives data (for example, such as the prediction factor and/or the actual value) for model generation from the recording unit 110, and generates the consumption prediction model. The consumption prediction model may be a model for calculating the predicted consumption amount of each of the plurality of types of hydrogen over the target period based on the consumption prediction factor.

The consumption prediction model generating unit 440 may generate the consumption prediction model using the information prior to the target period through pre-learning or the offline learning. The consumption prediction model generating unit 440 generates the consumption prediction model using, for example, regression analysis, Bayesian inference, neural networks, Gaussian mixture models, hidden Markov models and so on. It is also possible to predict the hydrogen consumption amount from a time sequence of the factors by using, for example, LSTM, RNN and other models with memory as a consumption prediction model. The consumption prediction model generating unit 440 supplies the generated consumption prediction model to the consumption prediction model updating unit 450.

The consumption prediction model updating unit 450 is connected to the recording unit 110 and the consumption predicting unit 460. The consumption prediction model updating unit 450 may update the consumption prediction model by learning, using training data that includes the actual value of the consumption amount of each type of hydrogen. It is desirable for the consumption prediction model updating unit 450 to learn further using information that is later in time than the information of the consumption prediction factor used to generate the consumption prediction model by the consumption prediction model generating unit 440. The consumption prediction model updating unit 450 may update the consumption prediction model by learning based on, for example, the consumption prediction factor over the past period and the actual value of the consumption amount of each type of hydrogen after the past period. The consumption prediction model updating unit 450 may learn the consumption prediction model using the information of the consumption prediction factor that is updated by the actual transition of the consumption amount of each type of hydrogen.

The consumption prediction model updating unit 450 may update the new consumption prediction model by learning for every predetermined update period. Alternatively, the consumption prediction model updating unit 450 may update the consumption prediction model according to various conditions such as the fact that the modes have been learned for a predetermined number of times or that the error difference due to learning has fallen below a predetermined threshold. The consumption prediction model updating unit 450 may execute the learning of the consumption prediction model according to the fact that the information of the consumption prediction factor has been updated. The consumption prediction model updating unit 450 may execute the learning for one or more times over the update period. The consumption prediction model updating unit 450 may also learn the consumption prediction model through adaptive learning or online learning or the like. The consumption prediction model updating unit 450 supplies the updated consumption prediction model to the consumption predicting unit 460.

The consumption predicting unit 460 is connected to the recording unit 110. The consumption predicting unit 460 generates the predicted consumption amount of each of the plurality of types of hydrogen using the consumption prediction model based on the consumption prediction factor.

The consumption predicting unit 460 predicts the consumption amount of hydrogen over the target period in the future for every predetermined period, for example. The consumption predicting unit 460 applies the information of the consumption prediction factor over the period immediately before the period to be predicted to the consumption prediction model and predicts the hydrogen consumption amount, for example. The consumption predicting unit 460 supplies the prediction result for storage as factors to be used in the prediction unit 120 or the planning unit 130, to the recording unit 110. The consumption predicting unit 460 may also directly supply the prediction result to another configuration or the prediction unit 120 or the planning unit 130.

The second hydrogen price prediction model generating unit 470 is connected to the recording unit 110 and the second hydrogen price prediction model updating unit 480. The second hydrogen price prediction model generating unit 470 receives data (for example, such as the prediction factor and/or the actual value) for model generation from the recording unit 110, and generates the second hydrogen price prediction model. The second hydrogen price prediction model may be a model for predicting the predicted second hydrogen price over the target period for the hydrogen produced by steam reforming based on the second hydrogen price prediction factor.

The second hydrogen price prediction model generating unit 470 may generate the second hydrogen price prediction model using the information prior to the target period through pre-learning or the offline learning. The second hydrogen price prediction model generating unit 470 generates the second hydrogen price prediction model using, for example, regression analysis, Bayesian inference, neural networks, Gaussian mixture models, hidden Markov models and so on. It is also possible to predict the second hydrogen price from a time sequence of the factors by using, for example, LSTM, RNN, and other models with memory as a second hydrogen price prediction model. The second hydrogen price prediction model generating unit 470 supplies the generated second hydrogen price prediction model to the second hydrogen price prediction model updating unit 480.

The second hydrogen price prediction model updating unit 480 is connected to the recording unit 110 and the second hydrogen price predicting unit 490. The second hydrogen price prediction model updating unit 480 updated the second hydrogen price prediction model by learning, using training data that includes the actual value of the second hydrogen price (for example, the price of hydrogen produced by the steam reforming apparatus 40). It is desirable for the second hydrogen price prediction model updating unit 480 to learn further using information that is later in time than the information of the second hydrogen price prediction factor used to generate the second hydrogen price prediction model by second hydrogen price prediction model generating unit 470. The second hydrogen price prediction model updating unit 480 may update the second hydrogen price prediction model by learning based on, for example, the second hydrogen price prediction factor over the past period and the actual value of the second hydrogen price after the past period. The second hydrogen price prediction model updating unit 480 learns the second hydrogen price prediction model using the information of the second hydrogen price prediction factor that is updated by the actual trading of the hydrogen produced by the steam reforming apparatus 40.

The second hydrogen price prediction model updating unit 480 may update the new second hydrogen price prediction model by learning for every predetermined update period. Alternatively, the second hydrogen price prediction model updating unit 480 may update the second hydrogen price prediction model according to various conditions such as the fact that the modes have been learned for a predetermined number of times or that the error difference due to learning has fallen below a predetermined threshold. The second hydrogen price prediction model updating unit 480 may execute the learning of the second hydrogen price prediction model according to the fact that the information of the second hydrogen price prediction factor has been updated. The second hydrogen price prediction model updating unit 480 may execute the learning for one or more times over the update period. The second hydrogen price prediction model updating unit 480 may also learn the second hydrogen price prediction model through adaptive learning or online learning or the like. The second hydrogen price prediction model updating unit 480 supplies the updated second hydrogen price prediction model to the second hydrogen price predicting unit 490.

The second hydrogen price predicting unit 490 is connected to the recording unit 110. The second hydrogen price predicting unit 490 generates the predicted second hydrogen price of the hydrogen produced by steam reforming over the target period using the second hydrogen price prediction model.

The second hydrogen price predicting unit 490 predicts the second hydrogen price over the target period in the future for every predetermined period, for example. The second hydrogen price predicting unit 490 receives the second hydrogen price prediction factor from the recording unit 110. The second hydrogen price predicting unit 490 applies the information of the second hydrogen price prediction factor over the period immediately before the period to be predicted to the second hydrogen price prediction model, and predicts the second hydrogen price, for example. The second hydrogen price predicting unit 490 supplies the prediction result for storage as the factor to be used in the prediction unit 120 or the planning unit 130, to the recording unit 110. The second hydrogen price predicting unit 490 may also directly supply the prediction result to another configuration of the prediction unit 120 or the planning unit 130.

The hydrogen production amount generating unit 500 is connected to the recording unit 110 and the hydrogen production amount updating unit 510. The hydrogen production amount generating unit 500 receives data (for example, such as the prediction factor and/or the actual value) for model generation from the recording unit 110, and generates the hydrogen production amount prediction model. The hydrogen production amount prediction model may be a model for predicting the hydrogen production amount of the hydrogen produced by steam reforming in the steam reforming apparatus 40 over the target period based on the hydrogen production amount prediction factor.

The hydrogen production amount generating unit 500 may generate the hydrogen production amount prediction model using the information prior to the target period through pre-learning or offline learning or the like. The hydrogen production amount generating unit 500 generates the hydrogen production amount prediction model using, for example, regression analysis, Bayesian inference, neural networks, Gaussian mixture models, hidden Markov models and so on. It is also possible to predict the hydrogen production amount prediction model from a time sequence of the factors by using, for example, LSTM, RNN and other models with memory as a hydrogen production amount. The hydrogen production amount generating unit 500 supplies the generated hydrogen production amount prediction model to the hydrogen production amount updating unit 510.

The hydrogen production amount updating unit 510 is connected to the recording unit 110 and the hydrogen production amount predicting unit 520. The hydrogen production amount updating unit 510 updates the hydrogen production amount prediction model by learning, using training data that includes the actual value of the hydrogen production amount. It is desirable for the hydrogen production amount updating unit 510 to learn further using the information later in time than the information of the hydrogen production amount prediction factor used to generate the hydrogen production amount prediction model by the hydrogen production amount generating unit 500. The hydrogen production amount updating unit 510 may update the hydrogen production amount prediction model by learning based on, for example, the hydrogen production amount prediction factor over the past period and the actual value of the hydrogen production amount after the past period. The hydrogen production amount updating unit 510 learns the hydrogen production amount prediction model using the information of the hydrogen production amount prediction factor updated by the hydrogen production in the actual steam reforming apparatus 40.

The hydrogen production amount updating unit 510 may update the new hydrogen production amount prediction model by learning for every predetermined update period. Alternatively, the hydrogen production amount updating unit 510 may update the hydrogen production amount prediction model according to various conditions such as the fact that the modes have been learned for a predetermined number of times or that the error difference due to learning has fallen below a predetermined threshold. The hydrogen production amount updating unit 510 may execute the learning of the hydrogen production amount prediction model according to the fact that the information of the hydrogen production amount prediction factor has been updated. The hydrogen production amount updating unit 510 may execute the learning for one or more times over the update period. The hydrogen production amount updating unit 510 may learn the hydrogen production amount prediction model through adaptive learning or online learning or the like. The hydrogen production amount updating unit 510 supplies the updated hydrogen production amount prediction model to the hydrogen production amount predicting unit 520.

The hydrogen production amount predicting unit 520 is connected to the recording unit 110. The hydrogen production amount predicting unit 520 generates the predicted hydrogen production amount of the hydrogen produced by steam reforming over the target period using the hydrogen production amount prediction model.

The hydrogen production amount predicting unit 520 predicts the hydrogen production amount over the target period in the future for every predetermined period, for example. The hydrogen production amount predicting unit 520 receives the hydrogen production amount prediction factor from the recording unit 110. The hydrogen production amount predicting unit 520 applies the information of the hydrogen production amount prediction factor over the period immediately before the period to be predicted to the hydrogen production amount prediction model, and predicts the hydrogen production amount, for example. The hydrogen production amount predicting unit 520 supplies the prediction result for storage as the factor to be used in the prediction unit 120 or the planning unit 130, to the recording unit 110. The hydrogen production amount predicting unit 520 may also directly supply the prediction result to another configuration of the prediction unit 120 or the planning unit 130.

Figure 6:
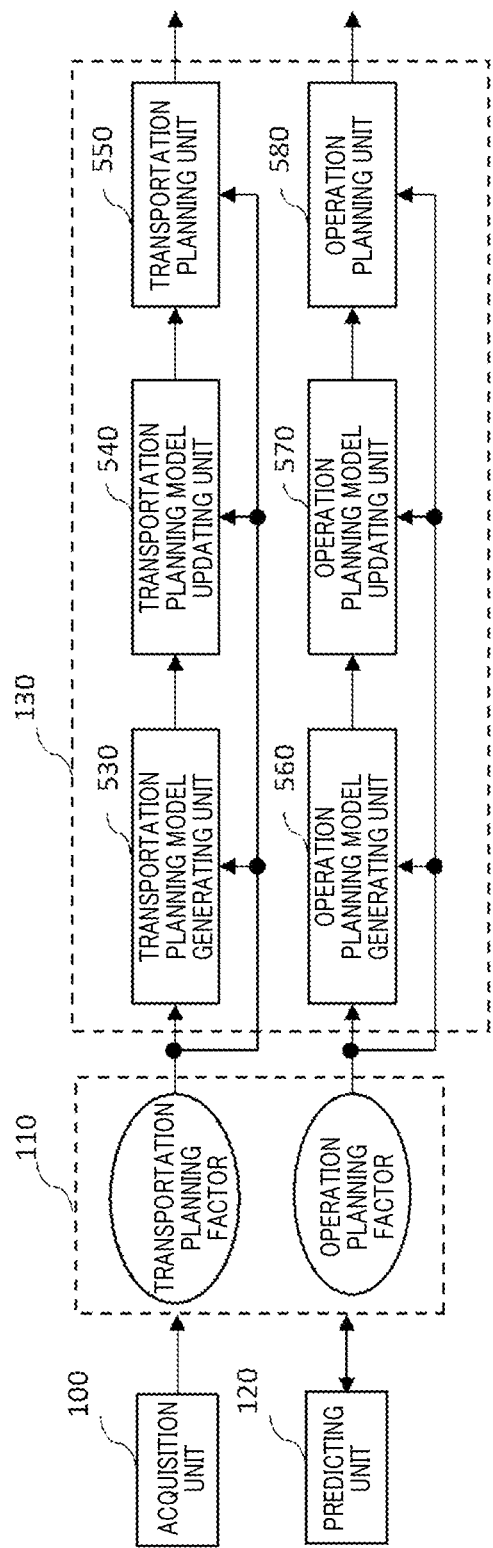
FIG. 6 illustrates in detail a configuration of a planning unit of the planning apparatus of the present embodiment.

FIG. 6 illustrates a configuration in detail of the planning unit 130 of the planning apparatus 90 of the present embodiment. The planning unit 130 includes a transportation planning model generating unit 530, a transportation planning model updating unit 540 and a transportation planning unit 550, and generates a transportation plan over the target period. The planning unit 130 includes an operation planning model generating unit 560, an operation planning model updating unit 570 and a operation planning unit 580, and generates an operation plan over the target period.

Herein, the recording unit 110 stores a planning factor including at least one of the transportation planning factor and the operation planning factor.

The transportation planning factor may include information on the transportation plan for transporting the hydrogen recorded in the hydrogen storage apparatus 60 to the demand customer 75. The transportation planning factor may include at least one of the storage amount of each of the plurality of types of hydrogen recorded in the hydrogen storage apparatus 60, the demand amount of each of the plurality of types of hydrogen, the operation amount of the hydrogen production apparatus 50 prior to the target period, and the predicted storage amount, the predicted demand amount, and the operation prediction of each of the plurality of types of hydrogen over the target period. The transportation planning factor may include the transportation prediction factor. The transportation planning factor may further include at least one of the type of the transportation means 70, the transportation route of the transportation means 70, the number of the transportation means 70, the transportation cost of each means of transportation 70, the arrangement of each means of transportation 70, and the hydrogen transportable amount of each means of transportation 70.

The operation planning factor may include information on the operation of the hydrogen production apparatus 50. The operation planning factor may include, for example, at least one of the operation amount of the hydrogen production apparatus 50, the certificate price, the hydrogen storage amount of each type of hydrogen of the hydrogen storage apparatus 60, the production efficiency of each type of hydrogen of the hydrogen production apparatus 50, the power generation amount of the power generation apparatus 30 and the electricity price prior to the target period, and the predicted demand amount, the predicted consumption amount, the predicted power generation amount, the predicted electricity price, the predicted certificate price, the predicted storage amount and the operation prediction of each type of hydrogen over the target period.

The transportation planning model generating unit 530 is connected to the recording unit 110 and the transportation planning model updating unit 540, and receives the data (for example, such as the planning factor and/or the actual performance) for model generation from the recording unit 110, and generates the transportation planning model. The transportation planning model may be a model for generating the transportation plan over the target period based on the transportation planning factor prior to the target period.

The transportation planning model generating unit 530 may generate the transportation planning model using the information prior to the target period through pre-learning or offline learning or the like. The transportation planning model generating unit 530 generates the transportation planning model using, for example, regression analysis, Bayesian inference, neural networks, Gaussian mixture models, and hidden Markov models and so on. The transportation plan can also be generated from a time sequence of factors if, for example, a model with LSTM, RNN and other memories is used as the transportation planning model. The transportation planning model generating unit 530 supplies the generated transportation planning model to the transportation planning model updating unit 540.

The transportation planning model updating unit 540 is connected to the recording unit 110 and the transportation planning unit 550. The transportation planning model updating unit 540 learns the transportation planning model by, for example, executing reinforcement learning such as the Q learning, the SARSA method or the Monte Carlo method.

The transportation planning model updating unit 540 may update the transportation planning model by learning based on the evaluation indicator for evaluating the hydrogen productivity (as one example, the benefits gained by the hydrogen production system 10 and/or the transportation cost of hydrogen) for the hydrogen production system 10. The transportation planning model updating unit 540 may learn and update the transportation planning model so that the evaluation indicator under constraint conditions including meeting the predicted demand amount for each type of hydrogen at each demand customer 75 is in a predetermined range (maximum value, as an example). The evaluation indicator may be calculated by the planning apparatus 90, or may be supplied to the planning apparatus 90 from an external apparatus. Herein, the constraint condition may further include at least one of the maximum storage amount of the hydrogen storage apparatus 60, the number of the transportation means 70, and the maximum transport amount of the transportation means 70.

It is desirable for the transportation planning model updating unit 540 to learn further using information that is later in time than the information of the transportation planning factor used to generate the transportation planning model by the transportation planning model generating unit 530. The transportation planning model updating unit 540 may update the transportation planning model by learning based on, for example, the transportation planning factor over the past period and the evaluation indicator of the transportation planning factor and/or the transportation plan after the past period. The transportation planning model updating unit 540 learns the transportation planning model using the evaluation indicator that is calculated according to the actual execution of the transportation plan.

The transportation planning model updating unit 540 may update a new transportation planning model by learning for every predetermined update period, for example. Alternatively, the transportation planning model updating unit 540 may update the transportation planning model according to various conditions such as the fact that the model has been learned for a predetermined number of times or that the evaluation indicator has reached its maximum, minimum, or predetermined range. The transportation planning model updating unit 540 may learn the transportation planning model by adaptive learning or online learning or the like. The transportation planning model updating unit 540 may execute the learning for one or more times over the update period. The transportation planning model updating unit 540 supplies the updated transportation planning model to the transportation planning unit 550.

The transportation planning unit 550 is connected to the recording unit 110. The transportation planning unit 550 generates the transportation plan for transporting the hydrogen recorded in the hydrogen storage apparatus 60 to at least one of the demand customers 75 over the target period using the transportation planning model based on the transportation planning factor.

The transportation planning unit 550 generates the transportation plan over the target period in the future for every predetermined period, for example. The transportation planning unit 550 applies the information of the transportation planning factor over the period immediately before the period to be planned to the transportation planning model and generates the transportation plan, for example. The transportation planning unit 550 may supply the planning data of the transportation plan to at least one of the operation planning unit 580, the prediction unit 120, the control unit 140 and the recording unit 110.

The operation planning model generating unit 560 is connected to the recording unit 110 and the operation planning model updating unit 570, and receives the data (for example, such as the planning factor and/or the actual performance) for model generation from the recording unit 110, and generate the operation planning model. The operation planning model may be a model for generating the operation plan over the target period based on the operation planning factor prior to the target period.

The operation planning model generating unit 560 may generate the operation planning model using the information prior to the target period through pre-learning or offline learning or the like. The operation planning model generating unit 560 generates the operation planning model using, for example, regression analysis, Bayesian inference, neural networks, Gaussian mixture models, and hidden Markov models and so on. The operation plan can also be generated from a time sequence of factors if, for example, a model with LSTM, RNN and other memories is used as the operation planning model. The operation planning model generating unit 560 supplies the generated operation planning model to the operation planning model updating unit 570.

The operation planning model updating unit 570 is connected to the recording unit 110 and the operation planning unit 580. The operation planning model updating unit 570 learns the operation planning model by, for example, executing reinforcement learning such as the Q learning, the SARSA method or the Monte Carlo method.

The operation planning model updating unit 570 updates the operation planning model by learning, based on the evaluation indicator for evaluating the hydrogen productivity (as one example, the benefits gained by the hydrogen production system 10) for the hydrogen production system 10. The operation planning model updating unit 570 may learn and update the operation planning model so that the evaluation indicator under constraint conditions including meeting the predicted demand amount for each type of hydrogen is in a predetermined range (maximum value, as an example). Herein, the constraint condition may further include at least one of the maximum storage amount of the hydrogen storage apparatus 60, the power generation efficiency of the power generation apparatus 30, the number of the transportation means 70, and the maximum transport amount of the transportation means 70.

Further, the evaluation indicator may be based on at least one of the operating cost, sales, profit, and original price per unit amount of each type of hydrogen supplied in the hydrogen production system 10. The evaluation indicator may be calculated by the planning apparatus 90, or may be supplied to the planning apparatus 90 from an external apparatus. The evaluation indicator may be calculated by, for example, an objective function.

It is desirable for the operation planning model updating unit 570 to learn further using information that is later in time than the information of the operation planning factor used to generate the operation planning model by the operation planning model generating unit 560. The operation planning model updating unit 570 may update the operation planning model by learning based on, for example, the operation planning factor over the past period and the evaluation indicator of the operation plan and/or the operation plan after the past period. The operation planning model updating unit 570 learns the operation planning model using the evaluation indicator that is calculated according to the actual execution of the operation plan.

The operation planning model updating unit 570 may update a new operation planning model by learning for every predetermined update period, for example. Alternatively, the operation planning model updating unit 570 may update the operation planning model according to various conditions such as the fact that the model has been learned for a predetermined number of times or that the evaluation indicator has reached its maximum, minimum, or predetermined range. The operation planning model updating unit 570 may learn the operation planning model by adaptive learning or online learning or the like. The operation planning model updating unit 570 may execute the learning for one or more times over the update period. The operation planning model updating unit 570 supplies the updated operation planning model to the operation planning unit 580.

The operation planning unit 580 is connected to the recording unit 110. The operation planning unit 580 generates the operation plan for generating a plurality of types of hydrogen with different environmental load of production by the hydrogen production apparatus 50 based on the predicted hydrogen demand amount of each of the plurality of types of hydrogen. The operation planning unit 580 is capable of generating an operation plan to generate the plurality of types of hydrogen by obtaining a certificate based on the predicted certificate price and considering a portion of the second power usage amount as the first power usage amount.

The operation planning unit 580 generates the operation plan over the target period in the future for every predetermined period, for example. The operation planning unit 580 applies the information of the operation planning factor over the period immediately before the period to be planned to the operation planning model and generates the operation plan, for example. The operation planning unit 580 may supply the planning data of the operation plan to at least one of the prediction unit 120, the control unit 140 and the recording unit 110.

Note that a plurality of factors including at least one of the prediction factor and the planning factor may be time sequence information hourly at approximate constant intervals. At least one of the plurality of factors may be added or updated, respectively, over time. At least one of the plurality of factors may include at least one of the prediction result generate in the planning apparatus 90 and the planning data. Also, at least one of the plurality of factors may include information supplied from the external database and the management apparatus 150 in the hydrogen production system 10 and so on. Also, each factor may include other factors.

The planning apparatus 90 according to the present embodiment described above can predict the demand of a plurality of types of hydrogen, generate an efficient operation plan according to the prediction result, and control each apparatus of the hydrogen production system 10 according to the operation plan. The following describes the operations of such a planning apparatus 90.

Figure 7:
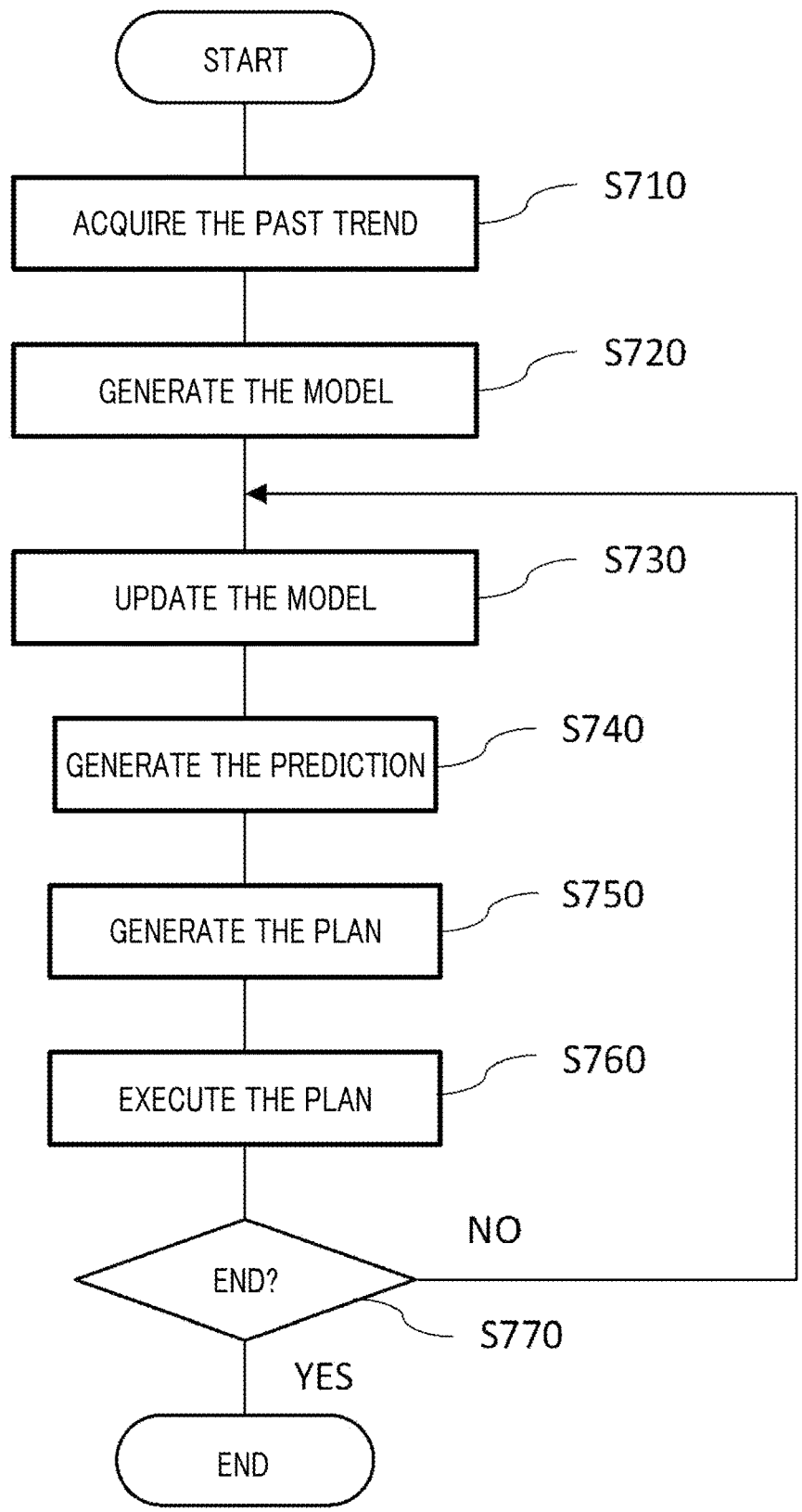
FIG. 7 illustrates an operation flow of the planning apparatus of the present embodiment.

FIG. 7 shows an example of the operation flow of the planning apparatus 90 according to the present embodiment.

The control unit 140 and the acquisition unit 100 acquire information on prediction factors and planning factors that are past trends (S710). The control unit 140 and the acquisition unit 100 acquire information on prediction factors and planning factors, for example, at time t0 to time t1. The recording unit 110 receives and stores the acquired information on prediction factors and planning factors. Also, the acquisition unit 100 may directly supply the information on prediction factors and planning factors to the prediction unit 120 and the planning unit 130.

The recording unit 110 may store, for example, at least one of the demand prediction factor, the power generation amount prediction factor, the electricity price prediction factor, the storage amount prediction factor, the first hydrogen price prediction factor, the operation prediction factor, the transportation prediction factor, the consumption prediction factor and the operation planning factor, in association with each of the plurality of types of hydrogen or power.

Then, the prediction unit 120 and the planning unit 130 generate a model (S720). The prediction unit 120 and the planning unit 130 generate the model based on the prediction factors and the planning factors over the period from time t0 to time t1, which are received from the recording unit 110.

The demand prediction model generating unit 200 generates a demand prediction model using the demand prediction factor over the period from time t0 to time t1. The electricity price prediction model generating unit 230 generates the electricity price prediction model using the electricity price prediction factor over the period from time t0 to time t1. The power generation amount prediction model generating unit 260 generates the power generation amount prediction model using the power generation amount prediction factor over the period from time t0 to time t1. The certificate price prediction model generating unit 290 generates the certificate price prediction model using the certificate price prediction factor over the period from time t0 to time t1. The storage amount prediction model generating unit 320 generates the storage amount prediction model using the storage amount prediction factor over the period from time t0 to time t1. The first hydrogen price prediction model generating unit 350 generates the first hydrogen price prediction model using the first hydrogen price prediction factor over the period from time t0 to time t1.

The operation prediction model generating unit 380 generates the operation prediction model using the operation prediction factor over the period from time t0 to time t1. The transportation prediction model generating unit 410 generates the transportation prediction model using the transportation prediction factor over the period from time t0 to time t1. The consumption prediction model generating unit 440 generates the consumption prediction model using the consumption prediction factor over the period from time t0 to time t1. The second hydrogen price prediction model generating unit 470 generates the second hydrogen price prediction model using the second hydrogen price prediction factor over the period from time t0 to time t1. The hydrogen production amount generating unit 500 generates the hydrogen production amount prediction model using the hydrogen production amount prediction factor over the period from time t0 to time t1.

The transportation planning model generating unit 530 generates the transportation planning model using the transportation planning factor over the period from time t0 to time t1. The operation planning model generating unit 560 generates the operation planning model using the operation planning factor over the period from time t0 to time t1.

At least one of the demand prediction model generating unit 200, the power generation amount prediction model generating unit 260, the consumption prediction model generating unit 440, the storage amount prediction model generating unit 320, the first hydrogen price prediction model generating unit 350, the operation prediction model generating unit 380, the transportation prediction model generating unit 410, the consumption prediction model generating unit 440 and the operation planning model generating unit 560 may generate a plurality of models using the factors corresponding to each of the plurality of types of hydrogen or power.

Also, the prediction unit 120 and the planning unit 130 may treat the virtual data based on the physical models of the target apparatuses in the hydrogen production system 10 as the prediction data, and generate the model by comparing the prediction data with the actual data acquired during the operations of the previous target apparatuses. For example, the prediction unit 120 and the planning unit 130 executes the learning and generates the model, so that the error between the prediction result or the planning data, and the target data derived from the previous actual data, is the minimum error (for example, 0) or equal to or less than a predetermined value.

The prediction unit 120 and the planning unit 130 treat the period of M days over the period from time t0 to time t1 as a virtual target period, as one example. Note that, M days may be a period of, for example, several days or ten or more days, or one or several weeks. Next, the prediction unit 120 and the planning unit 130 executes learning, so that the error, between the prediction result or the planning data of the target period based on the factors of a period prior to the target period over the period from time t0 to time t1, and the actual data or the virtual data of the target period, becomes minimal.

Note that, such a model generation by the prediction unit 120 and the planning unit 130 may be executed before acquiring the actual data of the target apparatus by the planning apparatus 90 during the operation of the target apparatus.

Then, the prediction unit 120 and the planning unit 130 learn and update the generated model (S730). Herein, the control unit 140 and the acquisition unit 100 may further acquire information of each factor. The control unit 140 and the acquisition unit 100 acquire information on each factor over a period from time t2 to time t3, for example. Also, the planning apparatus 90 may calculate or acquire the evaluation indicator of a plan performed over a period from time t2 to time t3 from an external apparatus or the like. Also, the prediction unit 120 and the planning unit 130 may generate information on each factor including, for example, the prediction result and the planning data or the like over the period from time t2 to time t3. Note that, the period from time t2 to time t3 is a period after the period from time t0 to time t1. The prediction unit 120 and the planning unit 130 may execute learning using the information on each new factor and/or the evaluation indicator.

For example, the demand prediction model updating unit 210 executes adaptive learning of the demand prediction model based on the demand prediction factor. The demand prediction model updating unit 210 may execute adaptive learning of the demand prediction model using the demand amount of each type of hydrogen, which is generated in the hydrogen production apparatus 50, over the period from time t2 to time t3. The demand prediction model updating unit 210 may execute learning so that the result of predicting the demand amount of each type of hydrogen over the period from time t2 to time t3 (actual value) using the demand prediction model, matches the actual demand amount of each type of hydrogen acquired over the period from time t2 to time t3.

The demand prediction model updating unit 210 treats the period of M days over the period from time t2 to time t3 as the virtual target period, as one example. The demand prediction model updating unit 210 may execute learning so that the error between the prediction result of the target period based on the demand prediction factor of the period prior to the target period over the period from time t2 to time t3, and the actual value of the target period, is a minimum error (for example, 0) or equal to or less than a predetermined value.

The electricity price prediction model updating unit 240 executes adaptive learning of the electricity price prediction model based on the electricity price prediction factor. The electricity price prediction model updating unit 240 may execute adaptive learning of the electricity price prediction model using the electricity price of each type of power over the period from time t2 to time t3. The electricity price prediction model updating unit 240 may execute learning so that the result for predicting the electricity price of each type of power over the period from time t2 to time t3 using the electricity price prediction model matches the actual electricity price (actual value) of each type of power acquired over the period from time t2 to time t3.

The electricity price prediction model updating unit 240 treats the period of M days over the period from time t2 to time t3 as the virtual target period as one example. The electricity price prediction model updating unit 240 executes learning so that the error between the prediction result of the target period based on the electricity price prediction factor of the period prior to the target period over the period from time t2 to time t3, and the actual value of the target period is a minimum error (for example, 0) or equal to or less than a predetermined value.

The power generation amount prediction model updating unit 270 executes adaptive learning of the power generation amount prediction model based on the power generation amount prediction factor. The power generation amount prediction model updating unit 270 may execute adaptive learning of the power generation amount prediction model using the power generation amount of the power generation apparatus 30 over the period from time t2 to time t3. The power generation amount prediction model updating unit 270 may execute learning so that the result for predicting the power generation amount of the power generation apparatus 30 over the period from time t2 to time t3 using the power generation amount prediction model matches the actual power generation amount (actual value) acquired over the period from time t2 to time t3.

The power generation amount prediction model updating unit 270 treats a period of M days over the period from time t2 to time t3 as the virtual target period as one example. The power generation amount prediction model updating unit 270 may execute learning so that the error between the prediction result of the target period based on the power generation amount prediction factor of the period prior to the target period over the period from time t2 to time t3, and the actual value of the target period, is a minimum error (for example, 0) or equal to or less than a predetermined value.

The certificate price prediction model updating unit 300 executes adaptive learning of the certificate price prediction model based on the certificate price prediction factor. The certificate price prediction model updating unit 300 may execute adaptive learning of the certificate price prediction model using the price of the GoO certificates over the period from time t2 to time t3. The certificate price prediction model updating unit 300 may execute learning so that the result for predicting the certificate price over the period from time t2 to time t3 using the certificate price prediction model matches the actual certificate price (actual value) acquired over the period from time t2 to time t3.

The certificate price prediction model updating unit 300 treats the period of M days over the period from time t2 to time t3 as the virtual target period as one example. The certificate price prediction model updating unit 300 may execute learning so that the error between the prediction result of the target period based on the certificate price prediction factor of the period prior to the target period over the period from time t2 to time t3, and the actual value of the target period is a minimum error (for example, 0) or equal to or less than the predetermined value.

The storage amount prediction model updating unit 330 executes adaptive learning of the storage amount prediction model based on the storage amount prediction factor related to the plurality of types of hydrogen. The storage amount prediction model updating unit 330 may execute adaptive learning of the storage amount prediction model using the storage amount of each type of hydrogen of the hydrogen storage apparatus 60 over the period from time t2 to time t3. The storage amount prediction model updating unit 330 may execute learning so that the result of predicting the storage amount of each of the plurality of types of hydrogen of the hydrogen storage apparatus 60 over the period from time t2 to time t3 using the storage amount prediction model, matches the actual storage amount (actual value) of the hydrogen storage apparatus 60 acquired over the period from time t2 to time t3.

The storage amount prediction model updating unit 330 treats the period of M days over the period from time t2 to time t3 as the virtual target period as one example. The storage amount prediction model updating unit 330 may execute learning so that the error between the prediction result of the target period based on the storage amount prediction factor of the period prior to the target period over the period from time t2 to time t3, and the actual value of the target period, is a minimum error (for example, 0) or equal to or less than a predetermined value.

The first hydrogen price prediction model updating unit 360 executes adaptive learning of the first hydrogen price prediction model based on the first hydrogen price prediction factor. The first hydrogen price prediction model updating unit 360 may execute adaptive learning of the first hydrogen price prediction model using the first hydrogen price over the period from time t2 to time t3. The first hydrogen price prediction model updating unit 360 may execute learning so that the result for predicting the first hydrogen price of each type of hydrogen over the period from time t2 to time t3 using the first hydrogen price prediction model, matches the actual first hydrogen price (actual value) acquired over the period from time t2 to time t3.

The first hydrogen price prediction model updating unit 360 treats a period of M days over the period from time t2 to time t3 as the virtual target period as one example. The first hydrogen price prediction model updating unit 360 may execute learning so that the error between the prediction result of the target period based on the first hydrogen price prediction factor of the period prior to the target period over the period from time t2 to time t3, and the actual value of the target period, is a minimum error (for example, 0) or equal to or less than a predetermined value.

The operation prediction model updating unit 390 executes adaptive learning of operation prediction model based on the operation prediction factor. The operation prediction model updating unit 390 may execute adaptive learning of the operation prediction model using the operation status of the hydrogen production apparatus 50 over the period from time t2 to time t3. The operation prediction model updating unit 390 may execute learning so that the result for predicting the operation amount or the like of the hydrogen production apparatus 50 over the period from time t2 to time t3 using the operation prediction model, matches the actual operation status (actual value) of the hydrogen production apparatus 50 acquired over the period from time t2 to time t3.

The operation prediction model updating unit 390 treats a period of M days over the period from time t2 to time t3 as the virtual target period as one example. The operation prediction model updating unit 390 may execute learning so that the error between the prediction result of the target period based on the operation prediction factor of the period prior to the target period over the period from time t2 to time t3, and the actual value of the target period, is a minimum error (for example, 0) or equal to or less than a predetermined value.

The transportation prediction model updating unit 420 executes adaptive learning of the transportation prediction model based on the transportation prediction factor. The transportation prediction model updating unit 420 may execute adaptive learning of the transportation prediction model using the transportation plan or the transportation condition for transporting hydrogen by the transportation means 70 from the hydrogen storage apparatus 60 over the period from time t2 to time t3. The transportation prediction model updating unit 420 may execute learning so that the result for predicting the transportation plan or the like over the period from time t2 to time t3 using the transportation prediction model, matches the actual transportation condition (actual value) acquired over the period from time t2 to time t3.

The transportation prediction model updating unit 420 treats a period of M days over the period from time t2 to time t3 as the virtual target period as one example. The transportation prediction model updating unit 420 may execute learning so that the error between the prediction result of the target period based on the transportation prediction factor of the period prior to the target period over the period from time t2 to time t3, and the actual value of the target period, is a minimum error (for example, 0) or equal to or less than a predetermined value.

The consumption prediction model updating unit 450 executes adaptive learning of the consumption prediction model based on the consumption prediction factor. The consumption prediction model updating unit 450 may execute adaptive learning of the consumption prediction model using the hydrogen consumption amount over the period from time t2 to time t3. The consumption prediction model updating unit 450 may execute learning so that the result for predicting the consumption amount of each type of hydrogen over the period from time t2 to time t3 using the consumption prediction model, matches the actual consumption amount (actual value) acquired over the period from time t2 to time t3.

The consumption prediction model updating unit 450 treats a period of M days over the period from time t2 to time t3 as the virtual target period as one example. The consumption prediction model updating unit 450 may execute learning so that an error between the prediction result of the target period based on the consumption prediction factor of the period prior to the target period over the period from time t2 to time t3. And the actual value of the target period is a minimum error (for example, 0) or equal to or less than a predetermined value.

The second hydrogen price prediction model updating unit 480 executes adaptive learning of the second hydrogen price prediction model based on the second hydrogen price prediction factor. The second hydrogen price prediction model updating unit 480 may execute adaptive learning of the second hydrogen price prediction model using the second hydrogen price over the period from time t2 to time t3. The second hydrogen price prediction model updating unit 480 may execute learning so that the result for predicting the second hydrogen price over the period from time t2 to time t3 using the second hydrogen price prediction model, matches the actual second hydrogen price (actual value) acquired over the period from time t2 to time t3.

The second hydrogen price prediction model updating unit 480 treats a period of M days over the period from time t2 to time t3 as the virtual target period as one example. The second hydrogen price prediction model updating unit 480 may execute learning so that an error between the prediction result of the target period based on the second hydrogen price prediction factor of the period prior to the target period over the period from time t2 to time t3, and the actual value of the target period, is a minimum error (for example, 0) or equal to or less than a predetermined value.

The hydrogen production amount updating unit 510 executes adaptive learning of the hydrogen production amount prediction model based on the hydrogen production amount prediction factor. The hydrogen production amount updating unit 510 may execute adaptive learning of the hydrogen production amount prediction model using the hydrogen production amount over the period from time t2 to time t3. The hydrogen production amount updating unit 510 may execute learning so that the result for predicting the hydrogen production amount price over the period from time t2 to time t3 using the hydrogen production amount prediction model, matches the actual hydrogen production amount (actual value) acquired over the period from time t2 to time t3.

The hydrogen production amount updating unit 510 treats a period of M days over the period from time t2 to time t3 as the virtual target period as one example. The hydrogen production amount updating unit 510 may execute learning so that error between the prediction result of the target period based on the hydrogen production amount prediction factor of the period prior to the target period over the period from time t2 to time t3, and the actual value of the target period, is a minimum error (for example, 0) or equal to or less than a predetermined value.

The transportation planning model updating unit 540 may execute adaptive learning of the transportation planning model based on the evaluation indicator according to the benefit obtained by the hydrogen production system 10. For example, the transportation planning model updating unit 540 may execute learning of the transportation planning model using the training data including the evaluation indicators over the period from time t2 to time t3. The transportation planning model updating unit 540 may execute reinforcement learning so that the value of the evaluation indicator under constraint conditions about the transportation plan over the period from time t2 to time t3, which is generated using the transportation planning model, reaches its maximum (for example, 0), minimum, or predetermined range.

The transportation planning model updating unit 540 treats a period of M days over the period from time t2 to time t3 as the virtual target period as one example. The transportation planning model updating unit 540 may execute reinforcement learning so that the objective function is maximized according to the benefits obtained by the hydrogen production system 10 under constraint conditions using the actual hydrogen demand over the target period and/or the record data of the performed transportation plan about the transportation plan of the target period based on the transportation planning factor of the period prior to the target period from time t2 to time t3.

The evaluation indicator may be calculated by the objective function based on at least one of the transportation cost, sales of each type of hydrogen, profit, and original price per unit amount e of each type of hydrogen supplied in the hydrogen production system 10. As an example, the evaluation indicator may be calculated by a weighted sum objective function, which is a sum of weight for each of a plurality of the transportation cost of the hydrogen production system 10, the sales of each type of hydrogen, the benefits, and the original price per unit amount of each type of hydrogen supplied.

The transportation planning model updating unit 540 may, as an example, divide the period of time subject to learning into a plurality of sections, and execute reinforcement learning of the profit from the actions to be performed in each state (for example, different states depending on the transportation condition of the transportation means 70, the hydrogen storage amount of each type of hydrogen, the hydrogen production amount in the hydrogen production apparatus 50 and so on) in each section, in case there is an input (for example, demand for at least one of the plurality of types of hydrogen or the like), and update the benefits from each action to maximize the evaluation indicator. In this way, the action for each state in each section can be updated, and the model, which can generate the appropriate transportation plan. Can be updated. The transportation planning model updating unit 540 may execute reinforcement learning over a plurality of periods while shifting the target period for each of the one or more sections.

The operation planning model updating unit 570 may execute adaptive learning of the operation planning model based on the evaluation indicator according to the benefits obtained by the hydrogen production system 10. For example, the operation planning model updating unit 570 may learn the operation planning model using the training data including the evaluation indicator over the period from time t2 to time t3. The operation planning model updating unit 570 may execute reinforcement learning so that the value of the evaluation indicator over the learning target period under the constraint conditions about the operation plan over the period from time t2 to time t3 generated using the operation planning model, reaches its minimum (for example, 0), maximum or predetermined range.

As one example, the evaluation indicator may be calculated by a weighted sum objective function, which is a sum of weight for each of a plurality of the operating cost of the hydrogen production system 10, the sales of each type of hydrogen, the benefits of each type of hydrogen, and the original price per unit amount of each type of hydrogen supplied by the hydrogen production system 10.

The operation planning model updating unit 570 treats a period of M days over the period from time t2 to time t3 as the virtual target period as one example. The operation planning model updating unit 570 may execute reinforcement learning so that the objective function is maximized according to the benefits obtained by the hydrogen production system 10 under constraint conditions using the actual demand of each type of hydrogen over the target period and/or the record data of the performed operation plan about the operation plan of the target period based on the operation planning factor of the period prior to the target period from time t2 to time t3.

The operation planning model updating unit 570 may, as an example, divide the period of time subject to learning into a plurality of sections, and execute reinforcement learning of the profit from the actions to be performed in each state (for example, different statuses according to the storage amount of each type of hydrogen of the hydrogen storage apparatus 60, the generation amount of each type of hydrogen in the hydrogen production apparatus 50 and so on) in each section, in case there is an input (for example, the demand, the power generation amount, certificate price and/or electricity price or the like for at least one of the plurality of types of hydrogen), and update the benefits from each action to maximize the evaluation indicator. In this way, the action for each state in each section can be updated, and the model, which can generate the appropriate operation plan. Can be updated. The operation planning model updating unit 570 may execute reinforcement learning over a plurality of periods while shifting the target period for each of the one or more sections.

Note that the target period for each component of the prediction unit 120 may respectively be a different period, or may be the same period. The target period for each component of the planning unit 130 may respectively be a different period, or may be the same period. Also, the target period for each component of the prediction unit 120 and the planning unit 130 may respectively be a different period, or may be the same period.

The prediction unit 120 and the planning unit 130 may start adaptive learning, continue adaptive learning for the initial update period required for updating, then execute the initial update of the model, and then repeat the update at constant intervals of period. Herein, it is desirable for the initial update period to be as predicted or planned target period or longer. The constant period of period for repeated updates may be several hours, ten or more hours, a day, tens of hours, or days. Note that the prediction unit 120 and the planning unit 130 may update the model with respectively different update period or the same update period.

Then, the prediction unit 120 generates the prediction result using the model (S740).

For example, the demand predicting unit 220 generates the predicted demand amount over the period from time t4 to time t5 using the corresponding demand prediction model and the demand prediction factor for each of the plurality of types of hydrogen. Note that the period from time t4 to time t5 may be a period after the period from time t2 to time t3, and a future period of the predicted time point. The demand predicting unit 220 may predict the predicted demand amount for each of the plurality of types of hydrogen based on the demand prediction factor including the predicted consumption amount. In this way, the demand predicting unit 220 can predict the demand according to the predicted hydrogen consumption amount with high precision. The demand predicting unit 220, as an example, applies the demand prediction factors for N days obtained during the initial update period and/or the demand prediction factors including the prediction results generated by the prediction unit 120 to the demand prediction model to predict the demand amount in the N days after the initial update period. The demand predicting unit 220 may supply the generated predicted demand amount to the recording unit 110 for storage.

For example, the electricity price predicting unit 250 predicts the electricity price over the period from time t4 to time t5 using the corresponding electricity price prediction model and the electricity price prediction factor for each of the plurality of types of power. The electricity price predicting unit 250, as an example, applies the electricity price prediction factors for N days obtained during the initial update period and/or the electricity price prediction factors including prediction results generated by the prediction unit 120 to the updated electricity price prediction model to predict the electricity price in the N days after the initial update period. The electricity price predicting unit 250 may supply the generated predicted electricity price to the recording unit 110 for storage.

For example, the power generation amount predicting unit 280 predicts the renewable energy power generation amount of the power generation apparatus 30 over the period from time t4 to time t5 using the updated power generation amount prediction model and the power generation amount prediction factor. The power generation amount predicting unit 280, as an example, applies the power generation amount prediction factors for N days obtained during the initial update period and/or the power generation amount prediction factors including the prediction results generated by the prediction unit 120 to the power generation amount prediction model to predict the renewable energy power generation amount in the N days after the initial update period. The power generation amount predicting unit 280 may supply the generated predicted power generation amount to the recording unit 110 for storage.

For example, the certificate price predicting unit 310 predicts the certificate price over the period from time t4 to time t5 using the updated certificate price prediction model and the certificate price prediction factor. The certificate price predicting unit 310, as an example, applies the certificate price prediction factors for N days obtained during the initial update period and/or the certificate price prediction factors including the prediction results generated by the prediction unit 120 to the certificate price prediction model to predict the certificate price prediction amount in the N days after the initial update period. The certificate price predicting unit 310 may supply the generated predicted certificate price to the recording unit 110 for storage.

For example, the storage amount predicting unit 340 predicts the storage amount of the hydrogen storage apparatus 60 over the period from time t4 to time t5 using the corresponding storage amount prediction model and the storage amount prediction factor for each of the plurality of types of hydrogen. The storage amount predicting unit 340, as an example, applies the storage amount prediction factors for N days obtained during the initial update period and/or the storage amount prediction factors including the prediction results generated by the prediction unit 120 to the updated storage amount prediction model to predict the storage amount in the N days after the initial update period. The storage amount predicting unit 340 may supply the generated predicted storage amount to the recording unit 110 for storage.

For example, the first hydrogen price predicting unit 370 predicts the first hydrogen price over the period from time t4 to time t5 using the corresponding first hydrogen price prediction model and the first hydrogen price prediction factor for each of the plurality of types of hydrogen (for example, green hydrogen, grey hydrogen, and blue hydrogen). The first hydrogen price predicting unit 370, as an example, applies the first hydrogen price prediction factors for N days obtained during the initial update period and/or the first hydrogen price prediction factors including the prediction results generated by the prediction unit 120 to the first hydrogen price prediction model to predict the first hydrogen price in the N days after the initial update period. The first hydrogen price predicting unit 370 may supply the generated predicted first hydrogen price to the recording unit 110 for storage.

For example, the operation predicting unit 400 generates the operation prediction over the period from time t4 to time t5 using the updated operation prediction model and the operation prediction factor. The operation predicting unit 400, as an example, applies the operation prediction factors for N days obtained during the initial update period and/or the operation prediction factors including the prediction results generated by the prediction unit 120 to the operation prediction model to predict the operation amount of the hydrogen production apparatus 50 for each type of hydrogen in the N days after the initial update period. The operation predicting unit 400 may supply the generated operation prediction to the recording unit 110 for storage.

For example, the transportation predicting unit 430 generates the transportation prediction over the period from time t4 to time t5 using the updated transportation prediction model and the transportation prediction factor. The transportation predicting unit 430, as an example, applies the transportation prediction factors for N days obtained during the initial update period and/or the transportation prediction factors including the prediction results generated by the prediction unit 120 to the transportation prediction model to predict the transportation plan in the N days after the initial update period. The transportation predicting unit 430 may supply the generated transportation prediction to the recording unit 110 for storage.

For example, the consumption predicting unit 460 predicts the hydrogen consumption amount over the period from time t4 to time t5 using the corresponding consumption prediction model and the consumption prediction factor for each of the plurality of types of hydrogen. The consumption predicting unit 460, as an example, applies the consumption prediction factors for N days obtained during the initial update period and/or the consumption prediction factors including the prediction results generated by the prediction unit 120 to the updated consumption prediction model to predict the consumption amount of each type of hydrogen in the N days after the initial update period. The consumption predicting unit 460 may supply the generated predicted consumption amount to the recording unit 110 for storage.

For example, the second hydrogen price predicting unit 490 predicts the second hydrogen price over the period from time t4 to time t5 using the updated second hydrogen price prediction model and the second hydrogen price prediction factor. The second hydrogen price predicting unit 490, as an example, applies the second hydrogen price prediction factors for N days obtained during the initial update period and/or the second hydrogen price prediction factors including the prediction results generated by the prediction unit 120 to the second hydrogen price prediction model to predict the second hydrogen price in the N days after the initial update period. The second hydrogen price predicting unit 490 may supply the generated predicted second hydrogen price to the recording unit 110 for storage.

For example, the hydrogen production amount predicting unit 520 generates the predicted hydrogen production amount over the period from time t4 to time t5 using the updated hydrogen production amount prediction model and the hydrogen production amount prediction factor. The hydrogen production amount predicting unit 520, as an example, applies the hydrogen production amount prediction factors for N days obtained during the initial update period and/or the hydrogen production amount prediction factors including the prediction results generated by the prediction unit 120 to the hydrogen production amount prediction model to predict the hydrogen production amount in the N days after the initial update period. The hydrogen production amount predicting unit 520 may supply the generated predicted hydrogen production amount to the recording unit 110 for storage.

The planning unit 130 generates a plan using the updated model (S750). For example, the transportation planning unit 550 may apply the transportation planning factor including the prediction result generated by the prediction unit 120 to the updated transportation planning model, and generate a transportation plan over the period from time t4 to time t5. The transportation planning unit 550, as an example, applies the values of transportation planning factors for N days obtained during the initial update period and/or the values of the transportation planning factors including the prediction results generated by the prediction unit 120 to the transportation planning model to generate the transportation plan for N days after the initial update period. The transportation planning unit 550 may further apply the operation prediction to the transportation planning model and generate the transportation plan. In this way, the transportation planning unit 550 can generate the transportation plan according to the operation of the hydrogen production apparatus 50.

For example, the operation planning unit 580 may apply the operation planning factor including the prediction result generated by the prediction unit 120 to the updated operation planning model, and generate an operation plan of the hydrogen production system 10 over the period from time t4 to time t5. The operation planning unit 580, as an example, applies the operation planning factors for N days obtained during the initial update period and/or the operation planning factors including the prediction results generated by the prediction unit 120 to the operation planning model to generate the operation plan for N days after the initial update period.

The operation planning unit 580 may apply the operation planning factor including the predicted hydrogen demand amount of each of the plurality of types of hydrogen to the operation planning model and generate the operation plan. The operation planning unit 580 can generate the plan for efficiently producing hydrogen while switching the supply of different types of power in order to satisfy the predicted hydrogen demand amount of each type of hydrogen.

The operation planning unit 580 may generate the operation plan further based on the predicted certificate price. The operation planning unit 580 can generate an operation plan for purchasing the certificate and changing the grey hydrogen into green hydrogen when the predicted demand amount for green hydrogen is suddenly increased, by using the predicted certificate price as the operation planning factor. Also, the operation planning unit 580 may also generate an operation plan including a plan using a certificate, which is purchased at the timing when the actual trade price is cheaper than the threshold, before the expiration date. The recording unit 110 may record at least one of the purchased certificate data, the corresponding power amount, the expiration date, the purchase price, and the average purchase price of the purchase price of all unused certificates. The storage management unit 145 may change and manage the grey hydrogen, with a corresponding amount to the power amount of the certificate, into green hydrogen, by receiving and using the unused certificate from the recording unit 110, according to the operation plan. Note that at least one of the purchased certificate data recorded in the recording unit 110, the corresponding power amount, the expiration date, the purchase price, and the average purchase price of the purchase price of all unused certificates may be used as a factor.

The operation planning unit 580 may generate the operation plan further based on at least one of the storage amount of each of the plurality of types of hydrogen prior to the target period, and the predicted storage amount of each of the plurality of types of hydrogen over the target period. The operation planning unit 580 can satisfy the demand of each type of hydrogen, and generate the operation plan for producing hydrogen efficiently so as to reach the storable range of the hydrogen storage apparatus 60.

The operation planning unit 580 may generate the operation plan further based on the predicted first hydrogen price of each of the plurality of types of hydrogen. The operation planning unit 580 can generate the operation plan to increase benefits. The operation planning unit 580 may generate the operation plan further based on at least one of the predicted second hydrogen price and the predicted production amount. The operation planning unit 580 can use the hydrogen produced by steam reforming and generate an operation plan for producing hydrogen to satisfy the demand of each type of hydrogen with a low cost. The operation planning unit 580 may generate the operation plan further based on the transportation prediction of each of the plurality of types of hydrogen. The operation planning unit 580 can generate the operation plan that can provide hydrogen of a target type of the transportation at the appropriate timing to the transportation means 70.

Note that when the hydrogen production system 10 includes a plurality of hydrogen production apparatuses 50 and a plurality of hydrogen storage apparatuses 60, the operation planning unit 580 may generate operation plans for each of the plurality of hydrogen production apparatuses 50 and the plurality of hydrogen storage apparatuses 60, or generate one operation plan for the plurality of hydrogen production apparatuses 50 and the plurality of hydrogen storage apparatuses 60. For example, the operation planning model generating unit 560 may generate one operation planning model corresponding to the plurality of hydrogen production apparatuses 50 and the plurality of hydrogen storage apparatuses 60, and the operation planning model updating unit 570 may execute reinforcement learning of and update the one operation planning model. In this case, the operation planning model may be a model for generating an operation plan to operate the plurality of hydrogen production apparatuses 50 and the plurality of hydrogen storage apparatuses 60 in coordination, as one example, may be a model for generating an operation plan in which the timing of the start of operation and the operation period of each of the plurality of hydrogen production apparatuses 50 and the duration of operation and so on are optimized.

Then, the control unit 140 controls each apparatus of the hydrogen production system 10 while managing each type of hydrogen by the storage management unit 145 according to the generated planning data (S760). The control unit 140 may transmit instructions in accordance with the generated planning data to each apparatus of the hydrogen production system 10 for control. The control unit 140 may output the planning data to a plurality of management apparatuses 150.

Next, in S770, if the hydrogen production apparatus 50 continues to operate, the planning apparatus 90 continues to control each apparatus of the hydrogen production system 10, and further continues to learn the model from S730 to update it to a more efficient model. The planning apparatus 90 may perform such model learning and updating in the background while generating predictions and operation plans and controlling the hydrogen production system 10.

Note that the hydrogen production system 10 may not have to include at least one of the configurations. In the present embodiment, the actual performance or actual value may also include the same type of data as the factors. Also, the hydrogen production system 10 may not have to have a power generation apparatus 30, and the hydrogen production apparatus 50 may be supplied with power from an external power generation apparatus 30.

Various embodiments of the present invention may be described with reference to flowcharts and block diagrams, and blocks in the flowcharts and the block diagrams may represent (1) steps of processes in which operations are performed or (2) sections of apparatuses responsible for performing operations. Certain steps and sections may be implemented by dedicated circuitry, programmable circuitry supplied together with computer-readable instructions recorded on computer-readable media, and/or processors supplied together with computer-readable instructions recorded on computer-readable media. Dedicated circuitry may include digital and/or analog hardware circuits and may include integrated circuits (IC) and/or discrete circuits. The programmable circuitry may include reconfigurable hardware circuits including logical AND, logical OR, logical XOR, logical NAND, logical NOR, and other logical operations, flip-flops, registers, memory elements such as field-programmable gate arrays (FPGA) and programmable logic arrays (PLA), and the like.

Computer-readable medium may include any tangible apparatus that can record instructions for execution by a suitable apparatus. As a result, the computer-readable medium having instructions recorded in the tangible apparatus comprises an article of manufacture including instructions which can be executed to create means for performing operations specified in the flowcharts or block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

The computer-readable instructions may include either source codes or object codes written in any combination of one or more programming languages that include assembler instructions, instruction set architecture (ISA) instructions, machine instructions, machine-dependent instructions, microcodes, firmware instructions, state setting data, an object-oriented programming language such as Smalltalk, JAVA (registered trademark), C++, or the like, and a conventional procedural programming language such as Python, a "C" programming language, or a similar programming language.

Computer-readable instructions may be provided to a processor of a general purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flowcharts or block diagrams. Examples of processors include computer processors, processing units, microprocessors, digital signal processors, controllers, microcontrollers, etc.

Figure 8:
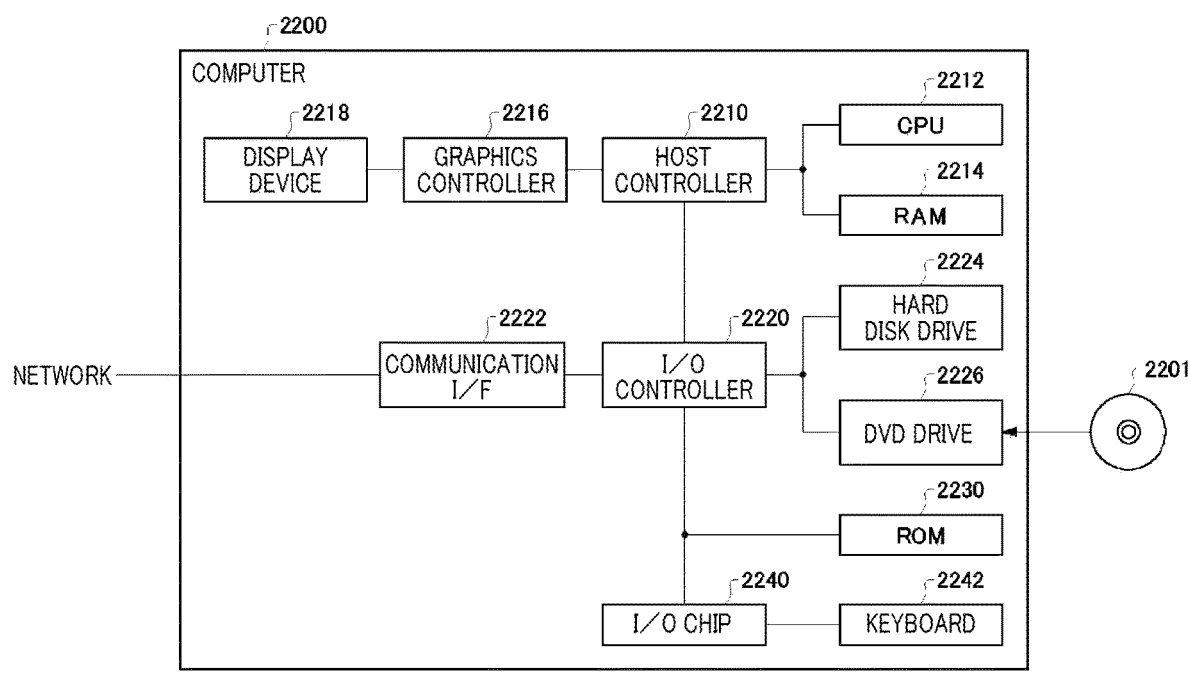
FIG. 8 illustrates an example of a computer in which a plurality of aspects of the present embodiment can be embodied wholly or partially.

FIG. 8 shows an example of a computer 2200 in which a plurality of aspects of the present invention may be wholly or partly embodied. A program that is installed in the computer 2200 can cause the computer 2200 to function for operations associated with an apparatus according to the embodiment of the present invention or as one or more sections in the apparatus, or cause the computer 2200 to perform the operations or the one or more sections thereof, and/or cause the computer 2200 to perform processes of the embodiment of the present invention or steps thereof. Such a program may be executed by a CPU 2212 and/or a graphics controller 2216 such as GPU in order to cause the computer 2200 to execute specific operations associated with some or all of the blocks in the flowcharts and the block diagrams described in the present specification.

The computer 2200 according to the present embodiment includes the CPU 2212, a RAM 2214, a graphics controller 2216, and a display apparatus 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs recorded in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display apparatus 2218.

The communication interface 2222 communicates with another electronic apparatus via the network. The hard disk drive 2224 stores the program and data used by the CPU 2212 in the computer 2200. The DVD-ROM drive 2226 reads the program or the data from a DVD-ROM 2201, and provides the program or the data to the hard disk drive 2224 via the RAM 2214. The IC card drive reads the program and data from the IC card and/or writes the program and data to the IC card.

The ROM 2230 stores therein a boot program or the like executed by the computer 2200 at the time of activation, and/or a program depending on the hardware of the computer 2200. The input/output chip 2240 may connect various input/output units via a parallel port, a serial port, a keyboard port, a mouse port, and the like to the input/output controller 2220.

A program is provided by a computer-readable medium such as the DVD-ROM 2201 or the IC card. The program is read from the computer-readable medium, installed into the hard disk drive 2224, RAM 2214, or ROM 2230, which are also examples of a computer-readable medium, and executed by the CPU 2212. The information processing described in these programs is read into the computer 2200, resulting in cooperation between a program and the above described various types of hardware resources. An apparatus or method may be constituted by realizing the operation or processing of information in accordance with the usage of the computer 2200.

For example, when a communication is executed between the computer 2200 and an external apparatus, the CPU 2212 may execute a communication program loaded in the RAM 2214, and instruct the communication interface 2222 to process the communication based on the processing written in the communication program. Under the control of the CPU 2212, the communication interface 2222 reads transmission data recorded in a transmission buffering region provided in a recording medium such as the RAM 2214, the hard disk drive 2224, the DVD-ROM 2201 or the IC card, transmits the read transmission data to the network, or writes received data which is received from the network to a reception buffering region or the like provided on the recording medium.

Further, the CPU 2212 may cause all or a necessary portion of a file or a database to be read into the RAM 2214, the file or the database having been recorded in an external recording medium such as the hard disk drive 2224, the DVD-ROM drive 2226 (DVD-ROM 2201), the IC card, etc., and perform various types of processing on the data on the RAM 2214. The CPU 2212 then writes back the processed data to the external recording medium.

Various types of information, such as various types of programs, data, tables, and databases, may be recorded in the recording medium to undergo information processing. The CPU 2212 may execute various types of processing on the data read from the RAM 2214 to write back a result to the RAM 2214, the processing being described throughout the present disclosure, specified by an instruction sequence of the programs, and including various types of operations, processing of information, condition determinations, conditional branch, unconditional branch, information retrievals/replacements, or the like. In addition, the CPU 2212 may search for information in a file, a database, or the like, in the recording medium. For example, when a plurality of entries each having an attribute value of a first attribute associated with an attribute value of a second attribute are recorded in the recording medium, the CPU 2212 may search, from among the plurality of entries, for an entry matching a condition in which the attribute value of the first attribute is specified, and read the attribute value of the second attribute recorded in the entry, thereby acquiring the attribute value of the second attribute associated with the first attribute that satisfies a predetermined condition.

The program or software module described above may be recorded on the computer 2200 or in a computer-readable medium near the computer 2200. Moreover, a recording medium such as a hard disk or RAM provided in a server system connected to a dedicated communication network or the Internet, for example a cloud server can be used as a computer-readable medium, and thus a program is provided to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: hydrogen production system; 20: utility grid; 30: power generation apparatus; 40: steam reforming apparatus; 50: hydrogen production apparatus; 60: hydrogen storage apparatus; 70: transportation means; 75: demand customer; 80: power generation source certification apparatus; 90: planning apparatus; 100: acquisition unit; 110: recording unit; 120: prediction unit; 130: planning unit; 140: control unit; 150: management apparatus; 200: demand prediction model generating unit; 210: demand prediction model updating unit; 220: demand predicting unit; 230: electricity price prediction model generating unit; 240: electricity price prediction model updating unit; 250: electricity price predicting unit; 260: power generation amount prediction model generating unit; 270: power generation amount prediction model updating unit; 280: power generation amount predicting unit; 290: certificate price prediction model generating unit; 300: certificate price prediction model updating unit; 310: certificate price predicting unit; 320: storage amount prediction model generating unit; 330: storage amount prediction model updating unit; 340: storage amount predicting unit; 350: first hydrogen price prediction model generating unit; 360: first hydrogen price prediction model updating unit; 370: first hydrogen price predicting unit; 380: operation prediction model generating unit; 390: operation prediction model updating unit; 400: operation predicting unit; 410: transportation prediction model generating unit; 420: transportation prediction model updating unit; 430: transportation predicting unit; 440: consumption prediction model generating unit; 450: consumption prediction model updating unit; 460: consumption predicting unit; 470: second hydrogen price prediction model generating unit; 480: second hydrogen price prediction model updating unit; 490: second hydrogen price predicting unit; 500: hydrogen production amount generating unit; 510: hydrogen production amount updating unit; 520: hydrogen production amount predicting unit; 530: transportation planning model generating unit; 540: transportation planning model updating unit; 550: transportation planning unit; 560: operation planning model generating unit; 570: operation planning model updating unit; 580: operation planning unit; 2200: computer; 2201: DVD-ROM; 2210: host controller; 2212: CPU; 2214: RAM; 2216: graphics controller; 2218: display apparatus; 2220: input/output controller; 2222: communication interface; 2224: hard disk drive; 2226: DVD-ROM drive; 2230: ROM; 2240: input/output chip; 2242: keyboard

What is claimed is:

1. An apparatus configured to generate an operation plan of a hydrogen production system comprising a hydrogen production apparatus, comprising at least one processor, wherein:
   the at least one processor generates a predicted demand amount of each of a plurality of types of hydrogen with a different environmental load of production over a target period of the operation plan;
   the at least one processor generates the predicted demand amount of each of the plurality of types of hydrogen using a demand prediction model based on a demand prediction factor;
   the at least one processor generates the operation plan, which generates the plurality of types of hydrogen with the different environmental load of production by the hydrogen production apparatus, based on a predicted hydrogen demand amount of each of the plurality of types of hydrogen;
   the operation plan includes a planned usage amount of each of a plurality of types of power with a different environmental load of power generation to plan a usage of power during the target period to generate the plurality of types of hydrogen;
   the at least one processor generates a predicted electricity price of each of the plurality of types of power using an electricity price prediction model over the target period of the operation plan;
   wherein the electricity price prediction model calculates the predicted electricity price based on an electricity price prediction factor including at least one of electricity price, power demand amount, power supply amount, renewable energy power generation amount, weather information over a period prior to the target period, and predicted power generation amount over the target period, for each of the plurality of types of power;

the at least one processor updates the electricity price prediction model by learning using an actual value of electricity price of each of the plurality of types of power;

the hydrogen production system comprises a hydrogen storage apparatus that stores in a mixed way, the plurality of types of hydrogen produced by the hydrogen production apparatus;

the at least one processor manages a storage amount of each of the plurality of types of hydrogen recorded in the hydrogen storage apparatus;

the at least one processor decreases a storage amount recorded of one hydrogen of the plurality of types of hydrogen by a supplied amount, when the one hydrogen is supplied from the hydrogen storage apparatus; and when one hydrogen of the plurality of types of hydrogen by the supplied amount is supplied from the hydrogen storage apparatus, the at least one processor treats the one hydrogen as a mixture of at least two of the plurality of types of hydrogen and decrease a storage amount recorded of each of the at least two hydrogen types by an amount supplied according to a ratio determined according to the one hydrogen.

2. The apparatus according to claim 1, wherein:
the at least one processor generates the predicted power generation amount of a first power generated using renewable energy of the plurality of types of power, using a power generation amount prediction model;

the power generation amount prediction model predicts the predicted power generation amount of the first power over the target period based on a power generation amount prediction factor including at least one of the renewable energy power generation amount and weather information over a period prior to the target period; and the at least one processor updates the power generation amount prediction model by learning, using an actual value of the renewable energy power generation amount.

3. The apparatus according to claim 1, wherein:
the at least one processor generates a predicted certificate price using a certificate price prediction model of a certificate to make available a second power of the plurality of types of power, which has a high environmental load of power generation, as a first power, which has a low environmental load of power generation;

the at least one processor generates the operation plan further based on the predicted certificate price;

the certificate price prediction model calculates the predicted certificate price based on a certificate price prediction factor including at least one of a certificate price, a power generation amount of the first power over a period prior to the target period, and a predicted power generation amount of the first power over the target period; and the at least one processor updates the certificate price prediction model by learning, using an actual value of the certificate price.

4. The apparatus according to claim 2, wherein:
the at least one processor generates a predicted certificate price using a certificate price prediction model of a certificate to make available a second power of the plurality of types of power, which has a high environmental load of power generation, as the first power, which has a low environmental load of power generation;

the at least one processor generates the operation plan further based on the predicted certificate price;

the certificate price prediction model calculates the predicted certificate price based on a certificate price prediction factor including at least one of a certificate price, a power generation amount of the first power over the period prior to the target period, and the predicted power generation amount of the first power over the target period; and the at least one processor updates the certificate price prediction model by learning, using an actual value of the certificate price.

5. The apparatus according to claim 3, wherein the at least one processor generates the operation plan of generating the plurality of types of hydrogen by treating a portion of the second power usage amount as the first power usage amount by obtaining the certificate based on the predicted certificate price.

6. The apparatus according to claim 1, wherein:
the at least one processor generates a predicted storage amount of hydrogen of each of the plurality of types of hydrogen, using a storage amount prediction model;

the at least one processor generates the operation plan, based on at least one of a storage amount of each of the plurality of types of hydrogen over a period prior to the target period and the predicted storage amount of each of the plurality of types of hydrogen;

the storage amount prediction model predicts a predicted storage amount of hydrogen of the hydrogen storage apparatus over the target period of each of the plurality of types of hydrogen based on a storage amount prediction factor including at least one of an operation amount of the hydrogen production apparatus, a hydrogen storage amount in the hydrogen storage apparatus, and a hydrogen demand amount over the period prior to the target period; and the at least one processor updates the storage amount prediction model by learning, using an actual value of the hydrogen storage amount of the hydrogen storage apparatus of each of the plurality of types of hydrogen.

7. The apparatus according to claim 6, wherein:
the at least one processor generates a predicted first hydrogen price of each of the plurality of types of hydrogen generated by the hydrogen production apparatus, using a first hydrogen price prediction model;

the at least one processor generates the operation plan further based on the predicted first hydrogen price of each of the plurality of types of hydrogen; and the first hydrogen price prediction model predicts the predicted first hydrogen price of the hydrogen over the target period of each of the plurality of types of hydrogen, based on a first hydrogen price prediction factor including at least one of a demand amount of each type of hydrogen, a consumption amount, and a price of hydrogen produced by steam reforming.

8. The apparatus according to claim 6, wherein the at least one processor generates a transportation plan which transports hydrogen recorded by the hydrogen storage apparatus to at least one demand customer, using a transportation planning model, based on a transportation planning factor including at least one of the storage amount of each of the plurality of types of hydrogen, a demand amount of each of the plurality of types of hydrogen over the period prior to the target period, the predicted storage amount, and the predicted demand amount of each of the plurality of types of hydrogen over the target period.

9. The apparatus according to claim 7, wherein the at least one processor generates a transportation plan which transports hydrogen recorded by the hydrogen storage apparatus to at least one demand customer, using a transportation planning model, based on a transportation planning factor including at least one of the storage amount of each of the plurality of types of hydrogen, the demand amount of each of the plurality of types of hydrogen over the period prior to the target period, the predicted storage amount, and the predicted demand amount of each of the plurality of types of hydrogen over the target period.

10. The apparatus according to claim 8, wherein:
the at least one processor generates an operation prediction of the hydrogen production apparatus using an operation prediction model;
the transportation planning model calculates the transportation plan further based on the operation prediction; and
the operation prediction model predicts the operation prediction over the target period, based on an operation prediction factor including at least one of the operation amount of the hydrogen production apparatus, the hydrogen storage amount of the hydrogen storage apparatus, and a demand amount of hydrogen over the period prior to the target period.

11. The apparatus according to claim 8, wherein:
the at least one processor generates a transportation prediction which transports each of the plurality of types of hydrogen recorded in the hydrogen storage apparatus to the at least one demand customer, using a transportation prediction model; and
the at least one processor generates the operation plan further based on the transportation prediction of each of the plurality of types of hydrogen.

12. The apparatus according to claim 10, wherein:
the at least one processor generates a transportation prediction which is configured to transport each of the plurality of types of hydrogen recorded in the hydrogen storage apparatus to the at least one demand customer, using a transportation prediction model; and
the at least one processor generates the operation plan further based on the transportation prediction of each of the plurality of types of hydrogen.

13. The apparatus according to claim 1, wherein:
the at least one processor generates a predicted consumption amount of each of the plurality of types of hydrogen, using a consumption prediction model; and
the at least one processor predicts the predicted demand amount of each of the plurality of types of hydrogen, based on the demand prediction factor including the predicted consumption amount.

14. The apparatus according to claim 2, wherein:
the at least one processor generates a predicted consumption amount of each of the plurality of types of hydrogen, using a consumption prediction model; and
the at least one processor predicts the predicted demand amount of each of the plurality of types of hydrogen, based on the demand prediction factor including the predicted consumption amount.

15. The apparatus according to claim 1, wherein:
the at least one processor generates a predicted second hydrogen price of hydrogen produced by steam reforming over the target period;
the at least one processor generates the operation plan further based on the predicted second hydrogen price;

the at least one processor generates a predicted hydrogen production amount of hydrogen produced by steam reforming over the target period; and
the at least one processor generates the operation plan further based on the predicted hydrogen production amount.

16. The apparatus according to claim 1,
wherein the plurality of types of hydrogen include hydrogen generated by renewable energy and hydrogen produced by non-renewable energy, and
wherein the plurality of types of hydrogen include hydrogen formulated in a predetermined ratio between hydrogen produced by renewable energy and hydrogen produced by non-renewable energy.

17. A method, using at least one processor, wherein the at least one processor generates an operation plan of a hydrogen production system comprising a hydrogen production apparatus, comprising:
the at least one processor generating a predicted demand amount of each of a plurality of types of hydrogen with a different environmental load of production over a target period of the operation plan; and
the at least one processor generating the operation plan generates the plurality of types of hydrogen with the different environmental load of production by the hydrogen production apparatus, based on a predicted hydrogen demand amount of each of the plurality of types of hydrogen,
wherein the hydrogen production system comprises a hydrogen storage apparatus that stores, using the at least one processor, in a mixed way, the plurality of types of hydrogen produced by the hydrogen production apparatus,
wherein the method comprises the at least one processor managing a storage amount of each of the plurality of types of hydrogen recorded in a hydrogen storage apparatus,
wherein the method comprises the at least one processor decreasing a storage amount recorded of one hydrogen of the plurality of types of hydrogen by a supplied amount, when the one hydrogen is supplied from the hydrogen storage apparatus, and
wherein when one hydrogen of the plurality of types of hydrogen by the supplied amount is supplied from the hydrogen storage apparatus, treating the one hydrogen as a mixture of at least two of the plurality of types of hydrogen and decreasing a storage amount recorded of each of the at least two hydrogen types by an amount supplied according to a ratio determined according to the one hydrogen.

18. A non-transitory recording medium having recorded thereon a program that, when executed by a computer, causes the computer to function as an apparatus configured to generate an operation plan of a hydrogen production system comprising a hydrogen production apparatus, comprising:
the computer generates a predicted demand amount of each of a plurality of types of hydrogen with a different environmental load of production over a target period of the operation plan; and
the computer generates the operation plan, which generates the plurality of types of hydrogen with the different environmental load of production by the hydrogen production apparatus, based on a predicted hydrogen demand amount of each of the plurality of types of hydrogen, wherein the hydrogen production system comprises a hydrogen storage apparatus that stores in a mixed way, the plurality of types of hydrogen produced by the hydrogen production apparatus, wherein the computer manages a storage amount of each of the plurality of types of hydrogen recorded in the hydrogen storage apparatus, wherein the computer decreases a storage amount recorded of one hydrogen of the plurality of types of hydrogen by a supplied amount, when the one hydrogen is supplied from the hydrogen storage apparatus, and wherein when one hydrogen of the plurality of types of hydrogen by the supplied amount is supplied from the hydrogen storage apparatus, the computer treats the one hydrogen as a mixture of at least two of the plurality of types of hydrogen and decrease a storage amount recorded of each of the at least two hydrogen types by an amount supplied according to a ratio determined according to the one hydrogen.

* * * * *